United States Patent
Muto

(10) Patent No.: US 7,995,706 B2
(45) Date of Patent: Aug. 9, 2011

(54) ELECTROMAGNETIC WAVE/PARTICLE BEAM SPECTROSCOPIC METHOD AND ELECTROMAGNETIC WAVE/PARTICLE BEAM SPECTROSCOPIC INSTRUMENT

(75) Inventor: Sadatsugu Muto, Toki (JP)

(73) Assignee: Inter-University Research Institute Corporation National Institutes of Natural Sciences, Tokyo (JP)

( * ) Notice: Subject to any disclaimer, the term of this patent is extended or adjusted under 35 U.S.C. 154(b) by 127 days.

(21) Appl. No.: 12/593,059

(22) PCT Filed: Mar. 12, 2009

(86) PCT No.: PCT/JP2009/054721
§ 371 (c)(1),
(2), (4) Date: Sep. 25, 2009

(87) PCT Pub. No.: WO2009/113606
PCT Pub. Date: Sep. 17, 2009

(65) Prior Publication Data
US 2010/0061513 A1    Mar. 11, 2010

(30) Foreign Application Priority Data
Mar. 13, 2008    (JP) ................................. 2008-064313

(51) Int. Cl.
*G01T 1/36*    (2006.01)

(52) U.S. Cl. .......................................... 378/82; 378/156
(58) Field of Classification Search .................... 378/82, 378/156; 250/281
See application file for complete search history.

(56) References Cited

FOREIGN PATENT DOCUMENTS
JP        58-27079       2/1983
JP        01-314988      12/1989

*Primary Examiner* — Jurie Yun
(74) *Attorney, Agent, or Firm* — Workman Nydegger

(57) ABSTRACT

The present invention provides an electromagnetic wave/particle beam spectroscopic instrument that is not easily deteriorated in spectroscopic capability, and is resistant to electromagnetic noise, vibrations, heavy sound, heat and specific particle beams of interest, particle beams other than electromagnetic waves, electric noise due to electromagnetic waves, mechanical destruction, and recoiling of solid constituent atoms and is also more resistant to radiation exposure on the detection means than the conventional energy resolving technologies. A spectroscopic instrument 10 includes a Laplace transform filter 11 that performs Laplace transform on the intensity of an incident spectrum, a detection element 15 that detects a transmitted intensity of the incident spectrum, and an arithmetic device 17 that performs inverse Laplace transform on the detected transmitted intensity of the incident spectrum, thereby calculating the incident intensity of the incident spectrum that has entered the Laplace transform filter 11.

14 Claims, 13 Drawing Sheets (Magnetic Circular Dichroism)

(Magnetic Linear Dichroism)

ELECTROMAGNETIC WAVE/PARTICLE BEAM SPECTROSCOPIC METHOD AND ELECTROMAGNETIC WAVE/PARTICLE BEAM SPECTROSCOPIC INSTRUMENT

FIELD OF THE INVENTION

The present invention relates to an electromagnetic wave/particle beam spectroscopic method and an electromagnetic wave/particle beam spectroscopic instrument.

BACKGROUND OF THE INVENTION

The conventional spectroscopic methods having a predetermined energy resolution apply the electronic excitation of solids or the interference effect of light by use of electromagnetic waves or particle beams. Based on these principles, the industries have already practically used a pulse height analyzer, a superconducting detector, a dispersive crystal, and a diffractive grating.

So-far developed energy discrimination methods by use of the current semiconductor detector and the like receive at most one photon or particle within a discrimination lapse of time of its circuit system and convert the energy of the received photon or particle into electron pulses, thus detecting its wave height value. That is, in the case of pulse height analysis, the count rate is determined by the processing power of a wave height discrimination circuit. In reality, the wave height accuracy and the count rate that determine an energy resolution balance with each other; by a state-of-the-art high counting rate digital wave height analyzer, a maximum count rate is set to 250 k counts/s while the resolution is 150 eV at 5 keV. A count rate of 250 k counts is equivalent to a time resolution of 20 ms in the case of estimating the transport of a heavy element impurity or the electron temperature of magnetic confinement high temperature plasma. On the other hand, in the case of the superconducting detector, the energy level of one photon is converted into a rise in temperature, so that the count rate is limited as in the case of pulse height analysis.

Further, in the case of the X-ray spectrum measurement technologies, the energy resolution is improved by more accurately constituting a minute structure as small as a wavelength or by decreasing thermal noise through ultra-cold cooling by employing a substance having a low excitation energy level as the photo-receptive element.

Prior-art search has found no conventional equivalents of the electromagnetic wave/particle beam spectroscopic method and instrument of the present invention because they are different from conventional ones in principle.

SUMMARY OF THE INVENTION

For these reasons, there is a problem that a high counting rate cannot be realized easily in the case of pulse height analysis and the superconducting detectors. Further, the diffractive grating and the dispersive crystal have a high dispersive power as well as a good energy resolution, but have very small measurement range conversely and find it difficult to capture all of the characteristic X-rays emitted from one kind of atoms.

The conventional spectroscopic methods and instruments have also a problem that their spectroscopic capability is easily deteriorated unless they shield the detection means against radiation exposure and block off electromagnetic noise, vibrations, heavy sound, and specific particle beams of interest, particle beams other than electromagnetic waves, electric noise due to electromagnetic waves, mechanical destruction, and recoiling of solid constituent atoms, because they are not resistant to these.

It is an objective of the present invention to provide an electromagnetic wave/particle beam spectroscopic method that can capture wide measurement ranges of high counting rates and energy levels without limiting the number of measurement-target electromagnetic waves or particle beams incident upon the photo-receptive element. It is another objective of the present invention to provide an electromagnetic wave/particle beam spectroscopic method that is not easily deteriorated in spectroscopic capability and are resistant to electromagnetic noise, vibrations, heavy sound, heat and specific particle beams of interest, particle beams other than electromagnetic waves, electric noise due to electromagnetic waves, mechanical destruction, and recoiling of solid constituent atoms and also more resistant to radiation exposure on the detection means than the conventional energy resolving technologies.

It is a further objective of the present invention to provide an electromagnetic wave/particle beam spectroscopic instrument capable of giving a high counting rate for an incident spectrum of electromagnetic waves or particle beams and capturing a wide measurement range of energy levels. It is a still further objective of the present invention to provide an electromagnetic wave/particle beam spectroscopic instrument that is not easily deteriorated in spectroscopic capability and is resistant to electromagnetic noise, vibrations, heavy sound, heat and specific particle beams of interest, particle beams other than electromagnetic waves, electric noise due to electromagnetic waves, mechanical destruction, and recoiling of solid constituent atoms and also more resistant to radiation exposure on the detection means than the conventional energy resolving technologies.

To achieve the above objectives, a first aspect of the present invention provides an electromagnetic wave/particle beam spectroscopic method comprising: a first step of causing an incident spectrum to enter a Laplace transform filter to perform Laplace transform on the intensity of this incident spectrum; a second step of receiving the spectrum that has passed through the Laplace transform filter to undergo Laplace transform, thereby detecting a transmitted intensity of this spectrum by using detection means; and a third step of performing inverse Laplace transform on the detected transmitted intensity of the spectrum, thereby calculating the intensity of the incident spectrum has entered the Laplace transform filter.

The principles of operation of the electromagnetic wave/particle beam spectroscopic method of the present invention are totally different from those of the conventional existing spectroscopic methods.

First, at the first step, Laplace transform is performed on the intensity of the incident spectrum by using the Laplace transform filter, which is hardware. Next, at the second step, the transmitted intensity of the incident spectrum that has undergone Laplace transform is detected by using the detection means. In the third step, inverse Laplace transform is performed on the transmitted intensity detected by the detection means, thereby calculating the intensity of the incident spectrum that has entered the Laplace transform filter.

Specifically, the Laplace transform filter contains an attenuation body for an incident spectrum and so uses the detection means to thereby measure, that is, detect the transmitted intensity of the incident spectrum that has passed through the attenuation body as continuously changing the mass of the attenuation body along the optical axis mass of the incident spectrum in this attenuation body.

The conventional X-ray spectrum measurement technologies have improved the energy resolution by more accurately constituting a minute structure as small as a wavelength or by decreasing thermal noise through ultra-cold cooling by employing a substance having a low excitation energy level as the photo-receptive element. In contrast, the energy resolution by the spectroscopic method of the present invention depends on accuracy in integration of Laplace transform and a statistic error in transmitted intensity. Therefore, with the spectroscopic method of the present invention, energy resolution is improved if a change in mass is relaxed more by enlarging the Laplace transform filter, that is, an optical element. That is, as a major feature thereof, if the optical element is increased in size so that it can be manufacture more easily, conversely its spectroscopic accuracy becomes better to improve the energy resolution. For example, in comparison with a semiconductor X-ray detector, the method of the present invention improves in energy resolution as the intensity of a light source increases. Therefore, the method is advantageous to a high-intensity light source.

The present spectroscopic method disperses the electromagnetic waves including all of the regions, that is, a region of radio waves through X-rays up to γ-rays, a particle beam region of flows of elemental particles, electrons, atomic nucleuses, atoms, and molecules, by using exactly the same principles. The particles include anti-substances, such as positrons, antiprotons, and anti-neutrons.

If an electromagnetic wave or particle beam is made incident upon a substance, its optical axial transmitted intensity attenuates as compared to its incident intensity. The attenuation ratio depends on the substances that constitute the attenuation body and the type and energy of the electromagnetic wave or particle beam. Since the present spectroscopic method is capable of selectively picking up only a signal that has occurred on the detection means owing to the electromagnetic wave or particle beam of interest by utilizing a difference in dependency thereof, this method is resistant to disturbance signals that have occurred due to any other than the electromagnetic wave and particle beam of interest. The physical interactions between the attenuation body and the electromagnetic wave or particle beam made incident upon the attenuation body include photoelectronic absorption in the atoms and molecules that constitute the attenuation body and scattering due to the atoms, molecules, atomic nucleuses, and electrons that constitute the attenuation body; in the case of attenuation body-constituent atomic nucleuses and electromagnetic waves, they include pair creation due to the electric field of electrons; and in the case of particle beams, they include capture by the attenuation body-constituent atomic nucleus. Further, in a case where the particle beam is an anti-substance such as a positron or an antiproton, they include pair annihilation due to the attenuation body-constituent atomic nucleus or electron.

FIG. 18 is a chart of an absorption coefficient in which its vertical axis represents the absorption coefficient of copper and its horizontal axis represents a photon energy level in a case where copper is employed as the attenuation body. Those vertical and horizontal axes are of a logarithmic scale. As shown in the figure, reasons for a case where the incident light attenuates include a variety of phenomena, such as pair creation due to the electric field of atomic nucleuses, pair creation due to the electric field of electrons, photoelectric absorption, incoherent scattering, and coherent scattering. Further, the reasons for the attenuation vary with the energy levels of the light.

For example, in the case of the absorption coefficient of copper, its photoelectric absorption is equivalent to a total sum in an energy level range of $10^3$ to $10^5$ eV. That is, at around this energy level, the absorption coefficient depends on photoelectric absorption. On the other hand, in an excess of an energy level of $10^7$ eV, the absorption coefficient of copper largely depends on pair creation by the electric field of atomic nucleuses.

(Principle of the Present Invention)

A description will be given of the mathematical principles and physical principles of the electromagnetic wave/particle beam spectroscopic method of the present invention with reference to FIG. 2.

According to the electromagnetic wave/particle beam spectroscopic method of the present invention, detection means for measuring a total sum energy amount of incident electromagnetic waves or particle beams is disposed behind a Laplace transform filter to measure the transmitted intensity. Assuming that the energy of incident light, which is monochromatic light, is E and the thickness of an attenuation body 200 is t, then an output signal I(t) that comes out of the attenuation body 200 is given by Expression (1) by using the incident intensity $I_0(E)$ of the incident light, the absorption coefficient α(E) of the attenuation body 200, and the detection efficiency f(E) of the detector. The detection means includes, for example, a semiconductor detector.

Accordingly, Expression (2) can be used instead in a case where the incident electromagnetic waves or particle beams are a spectrum. Further, if the absorption coefficient α(E) of the attenuation body 200 in the X-ray region is highly accurate as given in Expression (4) and so is reduced to a physical fact that can be approximated by a power function using a and b as constants, Expression (2) is reduced to Laplace transform as given in Expression (3) if the detection efficiency f(E) of the detector is equal to E. f(E)=E holds true in an example of the semiconductor detector. The attenuation body includes, for example, metal. Constants a and b are peculiar to the attenuation body for the Laplace transform filter. Therefore, the absorption coefficient α(E) of the attenuation body 200 is also a value peculiar to the attenuation body.

It is therefore proved mathematically that the intensity of an incident spectrum, that is, the incident intensity is uniquely obtained by an inverse Laplace transform expression (5). In the expression, i is an imaginary unit and c is an arbitrary positive real number. However, Expression (5) is not available despite that it is a mathematically exact solution. This is because an measurement value I(t) is a real number value as a function of a real number thickness t, whereas Expression (5) requires a complex number value I(t) as a function of a complex number thickness t. Since high accuracy cannot be ensured in an integration interval of c±i∞ when finding a function form for an arbitrary I(t), a solution is achieved by directly integrating an obtained measurement value as indicated by Expression (6).

Expression (1)

$$I(t) = I_0(E)f(E)e^{-\alpha(E)t} \quad (1)$$

Expression (2)

$$I(t) = \int_0^\infty dE\, I_0(E)f(E)e^{-\alpha(E)t} \quad (2)$$

Expression (3)

$$I(t) = a^{\frac{2}{b}}b^{-1}\int_0^\infty d\alpha\, \alpha^{-\frac{b+2}{b}}I_0(\alpha)e^{-\alpha t}$$

-continued

Expression (4)

$$\because \alpha(E) \equiv aE^{-b}$$

Expression (5)

$$I_0(\alpha) = \frac{a^{-\frac{2}{b}}b}{2\pi i}\alpha^{\frac{b+2}{b}}\int_{c-i\infty}^{c+i\infty} dt I(t)e^{\alpha t}$$

That is, Expressions (6) and (8) are practical expressions for inverse transform.

Particularly, Expression (8) is so-called Mellin transform, which once transforms a measurement value into complex-valued wave packets. Expression (6) is a mathematically exact solution of Expression (2), which is an integral expression, uniquely derived by the inventor, which sums up the wave packets by integration again to constitute an incident spectrum. It is possible not only to obtain an incident spectrum from a real number measurement value by Mellin transform but also to represent the incident spectrum by the absorption coefficient $\alpha(E)$ as the mathematically exact solution of Expression (2).

Expression (6) was found first by the inventor in the field of physics and provides an important basis for practical application of the present spectroscopic method. $\Gamma$ in Expression (9) indicates a gamma-function. Further, the integration in Expression (6) is the same value as that in the case of obtaining only a Fourier component of wave number $\mathbf{0}$.

G(s) defined by Expression (9) physically means a wave packet of a unit-intensity line spectrum at the level of energy E that has passed through the attenuation body. Therefore, a division in the integral sign of Expression (6) means to calculate the intensity at the energy E of the incident spectrum.

Expression (6)

$$I_0(E) = -\frac{1}{2\pi i E^F}\beta(E)\int_{c-i\infty}^{c+i\infty} ds \frac{g(s)}{G(s)}$$

Expression (7)

$$\because \beta(E) \equiv \frac{d}{dE}\ln\alpha(E)$$

Expression (8)

$$\because g(s) \equiv \int_0^\infty dt I(t)t^{s-1}$$

Expression (9)

$$\because G(s) \equiv \alpha(E)^{-s}\Gamma(s) = \int_0^\infty dt e^{-\alpha(E)t}t^{s-1}$$

It is possible to derive the properties of the present spectroscopic method from practical expressions (6), (7), (8), and (9). First, Expression (8) tells that the accuracy of a spectrum obtained comes better as a measurement error becomes smaller and a change in thickness t of the attenuation body 200 being measured becomes more minute. Further, as shown in FIG. 2, as the thickness t of the attenuation body 200 becomes larger, I(t) attenuates to become smaller, thus increasing a statistical error. "s" is an integral variable that changes from $c-i\infty$ to $c+i\infty$.

However, since s in the $t^{s-1}$ term is a complex number, plus and minus will be reversed at a higher frequency in integration if the thickness t of the attenuation body 200 becomes larger, so that the statistical error less contributes to g(s) than the case where the thickness t of the attenuation body 200 is smaller. Expressions (7) and (6) indicate that light can be dispersed in a region where the absorption coefficient $\alpha(E)$ of the attenuation body 200 changes with respect to the energy.

Attention must be paid to dispersion in an energy region where a change in the absorption coefficient $\alpha(E)$ with respect to the energy is not monotonous. First of all, where absorption changes greatly, the differential value of the absorption coefficient $\alpha(E)$ changes steeply for a certain absorption edge, so that to avoid a drop in calculation accuracy, highly accurate data of the absorption coefficient $\alpha(E)$ is required. Further, there is a possibility that a region may occur where light cannot be dispersed. Expression (10) is obtained by changing Expression (6) in terms of n infinitely narrow line spectra having different energy levels [energy Ei (i=1, 2, . . . n), intensity Ii (i=1, 2, . . . n)]. $\delta$ indicates a delta function.

Expression (10)

$$I(E) = \sum_{i=1}^{n} I_i\delta(\ln(\alpha(E)) - \ln(\alpha(Ei)))\frac{d}{dE}(\ln(\alpha(E)) - \ln(\alpha(Ei)))$$

That is, calculation results are cross-checked between the different energy levels having such an equal absorption coefficient that rather than $\delta(E-Ei)$, $\delta(\ln(\alpha(E))-\ln(\alpha(Ei))d/dE(\ln(\alpha(E))-\ln(\alpha(Ei))$ is established to give $\alpha(Ei)=\alpha(Ej)$ ($i\neq j$). In other words, in such a case, there exists an exclusive spectroscopic region, so that it is necessary only to prohibit the entry of either one of the spectrum components. It is shown that an actual exclusive spectroscopic region exists near an absorption edge as shown in FIG. 3 to be given later. Further, although it is obvious, the light source must keep a constant spectrum intensity during a lapse of time when light is dispersed once by the Laplace transform filter.

FIG. 3 shows the case of nickel, where light can be dispersed at 0.8 to 8.0 keV between an L absorption edge and an M absorption edge in an X-ray region near 1 keV. The absorption coefficient of nickel in an interval between 0.8 keV and 8.0 keV changes in accordance with the function $aE^b$ (a=8.29×10$^{12}$, b=2.63), thus indicating that light can be dispersed. However, in the case of obtaining a larger spectroscopic region, energy bands (regions A1 and A2 in the figure) where the absorption coefficient is the same near the absorption edges provide an exclusive spectroscopic region. It is therefore necessary only to prohibit the entry of either one of the spectrum components.

Here, a continuous change in mass of the attenuation body along the optical axis of an incident spectrum includes a case where the mass along the optical axis of the incident spectrum changes continuously time-wise and a case where the attenuation body changes in shape without changes in mass within the same lapse of time. The mass of the attenuation body along the optical axis of an incident spectrum changing time-wise, for example, is a case where the mass of the attenuation body along the optical axis of the incident spectrum linearly changes continuously by detecting the transmitted intensity of the incident spectrum by using a single or a plurality of detection means.

On the other hand, the attenuation body changing in shape without changes in mass during the same lapse of time is a case, for example, where only the thickness of the attenuation body, if it is solid, is arranged so as to linearly change continuously and a plurality of detection means are disposed along it in a direction in which the thickness changes, thereby simultaneously detecting the intensities of transmitted lights that have passed through the attenuation body, that is, transmitted intensities at each of the sites where the thickness changes.

Preferably, the attenuation body is selected from among solid, liquid, and gas depending on the wavelength of electromagnetic waves and the type of particle beams.

Here, the solid attenuation body may be copper, nickel, gadolinium, aluminum and the like. The liquid attenuation body may be gallium. The gas attenuation body may be argon.

Here, assume that the attenuation body is solid. In the case of continuously changing the mass of the attenuation body along the optical axis of an incident spectrum, for example, in the case of continuously changing the thickness of this solid, variables to be transformed by Laplace transform correspond to the variables with which the thickness axis of the attenuation body and the energy axis of the spectrum are transformed to each other.

Also assume that the attenuation body is liquid. In the case of continuously changing its depth, variables to be transformed by Laplace transform correspond to the variables with which the depth axis of the attenuation body and the energy axis of the spectrum are transformed to each other. Still further, assume that the attenuation body is gas. In the case of continuously changing its density, variables to be transformed by Laplace transform correspond to the variables with which the density axis of the attenuation body and the energy axis of the spectrum are transformed to each other.

Preferably, the Laplace transform filter includes an attenuation body that attenuates an incident spectrum in accordance with its own mass, while at the second step, the transmitted intensity of this incident spectrum is preferably detected by using the detection means in a condition where the mass of the attenuation body along the optical axis of this incident spectrum is changing continuously. It is thus possible to perform Laplace transform on an incident spectrum by detecting the transmitted intensity of the incident spectrum by using the detection means in a condition where the mass of the attenuation body along the optical axis of this incident spectrum is changing continuously.

Further, it is preferable that in the second step, the mass of the attenuation body along the optical axis of the incident spectrum be changed by using mass changing means for continuously changing the mass of the attenuation body along the optical axis of the incident spectrum time-wise.

By so doing, the mass changing means can be used to continuously change the mass of the attenuation body along the optical axis of the incident spectrum, thereby performing Laplace transform on the incident spectrum.

If the attenuation body is solid, for example, the mass changing means is realized by moving the attenuation body in such a manner that the mass of the attenuation body along the optical axis of an incident spectrum continuously changes time-wise. If the attenuation body is liquid, it is necessary only to continuously change the depth of the attenuation body time-wise in order to continuously change the mass of the attenuation body along the optical axis of an incident spectrum. If the attenuation body is gas, it is necessary only to continuously change the density of the attenuation body time-wise, that is, continuously change the pressure of the gas time-wise, in order to continuously change the mass of the attenuation body along the optical axis of an incident spectrum. Further, in the cases of liquid or gas, a detector that is movable in the optical axial direction may be mounted in a vessel, thereby continuously changing the length of the optical axis that passes through the liquid or the gas.

Further, it is preferable that the mass of the attenuation body along the optical axis of the incident spectrum be set so as to change linearly in a direction intersecting with this optical axis, that is, continuously change linearly, and the mass changing means move at least ether one of the Laplace transform filter and the detection means relatively in a direction intersecting with the optical axis.

To move at least either one of them relatively includes to move only the Laplace transform filter, move only the detection means, or move them both.

With this, the mass of the attenuation body along the optical axis of the incident spectrum is set so as to change linearly in a direction intersecting with this optical axis, and Laplace transform can be performed on an incident spectrum because the mass changing means relatively moves the Laplace transform filter and the detection means in such a direction as to it intersects with the optical axis.

Further, it is preferable that the Laplace transform filter comprise a chamber containing an attenuation body made of gas that attenuates a spectrum in accordance with its own density, and the mass changing means continuously change the pressure of this attenuation body at a site of the Laplace transform filter that faces the detection means, thereby continuously changing the density of this gas. As described above, if the attenuation body is gas, in order to change its mass along the optical axis of an incident spectrum, it is necessary only to change the pressure of the gas in the chamber to thereby change its density.

By so doing, the Laplace transform filter comprises a chamber containing an attenuation body made of gas that attenuates a spectrum in accordance with its own density, so that the second step continuously changes the pressure of the attenuation body at a site of the Laplace transform filter that faces the detection means. As a result, Laplace transform can be performed on the incident spectrum by continuously changing the density of the gas.

Further, it is preferable that the attenuation body at the first step be a ferromagnetic body so that the incident spectrum is caused to enter in a condition where a magnetic field in a predetermined direction with respect to the optical axis of the incident spectrum is applied to the attenuation body, and there is provided a fourth step of calculating the intensity of a polarized spectrum based on the intensity of the incident spectrum obtained at the third step.

That is, in a case where the absorption coefficient of an attenuation body exhibits dependency on the polarization of an electromagnetic wave or a particle beam as in a case where the attenuation body is a ferromagnetic body and so magnetized as it is applied with a magnetic field in a direction in which the magnetic field forms a predetermined direction with respect to the optical axis of an incident spectrum, each of the polarized components can be obtained at the fourth step. Here, if a magnetized ferromagnetic body is used as an attenuation body, the absorption coefficient of the attenuation body exhibits dependency on the polarization of an electromagnetic wave or a particle beam.

In Expressions (11) to (14), "+" and "−" indicate polarization. Further, $I_{\pm}(E)$ indicates a polarized spectrum and $J_{\pm}(t)$ indicates a transmitted intensity that has passed through the Laplace transform filter. Particularly in the case of polarization spectroscopy of an X-ray, it is possible to utilize not only the magnetic circular dichroism at absorption edges but also such an effect that the magnetic circular dichroism remains even in a region distant from the absorption edges owing to the Fano effect caused by interference between the discrete excitation state and the continuous excitation state of core electrons. Although in some cases, a magnetic circular dichroism of approximately 100% appears at the absorption edges, 5% or less of it due to the Fano effect will remain. However, in the case of high brilliant light having a high degree of polarization or a steady light source, Expression (11) can be used to evaluate a spectrum of each polarized component. However, in some cases, the magnetic circular dichroism is reversed in polarity at the absorption edges. If an energy level value is crossed where the polarity is reversed, it is preferable to prohibit the entry of the spectrum in either one of the regions.

Expression (11)

$$I_\pm(E) = -\frac{1}{4\pi i}\int_{c-i\infty}^{c+i\infty} ds \left[ \frac{g_+(s) + g_-(s)}{G_+(s) + G_-(s)} \pm \frac{g_+(s) - g_-(s)}{G_+(s) - G_-(s)} \right] \quad (11)$$

Expression (12)

$$\because g_\pm(s) \equiv \int_0^\infty dt J_\pm(t) t^{s-1} \quad (12)$$

Expression (13)

$$\because G_\pm^{-1}(s) \equiv \left(\frac{d}{dE}\ln\alpha_\pm(E)\right) \alpha_\pm^s(E) \Gamma^{-1}(s) \quad (13)$$

Expression (14)

$$\because J_\pm(t) \equiv \int_0^\infty dE I_+(E) e^{-\alpha_\pm(E)t} + \int_0^\infty dE I_-(E) e^{-\alpha_\mp(E)t} \quad (14)$$

It is thus possible to provide an electromagnetic wave/particle beam spectroscopic method that can obtain each of polarized components if the absorption coefficient of an attenuation body exhibits dependency on polarization of the electromagnetic wave/particle beam.

A second aspect of the present invention provides an electromagnetic wave/particle beam spectroscopic instrument comprising: a Laplace transform filter that receives an incident spectrum and performs Laplace transform on the intensity of the incident spectrum; detection means for receiving the spectrum that has undergone the Laplace transform, thereby detecting a transmitted intensity of the spectrum; and inverse Laplace transform means for performing inverse Laplace transform on the detected transmitted intensity of the spectrum, thereby calculating the intensity of the incident spectrum that has caused to enter to the Laplace transform filter.

It is thus possible to give a high counting rate for an incident spectrum of electromagnetic waves or particle beams and, at the same time, capture a wide measurement range of energy levels. It is also possible to provide an electromagnetic wave/particle beam spectroscopic instrument that is not easily deteriorated in spectroscopic capability and is resistant to electromagnetic noise, vibrations, heavy sound, heat and specific particle beams of interest, particle beams other than electromagnetic waves, electric noise due to electromagnetic waves, mechanical destruction, and recoiling of solid constituent atoms and also more resistant to radiation exposure on the detection means than the conventional energy resolving technologies. Further, the present instrument can be greatly expected as an electromagnetic wave/particle beam spectroscopic approach used in high temperature plasma fusion experiments to be conducted in the future, because it can be stably ensured in performance without a need of maintenance even in an environment where it cannot be ensured of the operations or the performance of the conventional semiconductor detectors, superconducting detectors and crystals, and diffractive gratings.

The Laplace transform filter preferably includes an attenuation body that attenuates a spectrum in accordance with its own mass, and it is preferable to provide an electromagnetic wave/particle beam spectroscopic instrument comprising mass changing means for continuously changing the mass of the attenuation body along the optical axis of the incident spectrum time-wise.

If the attenuation body is solid, for example, the mass changing means is realized by moving the attenuation body in such a manner that the mass of the attenuation body along the optical axis of an incident spectrum continuously changes time-wise.

If the attenuation body is liquid, the mass changing means can continuously change the depth of the attenuation body time-wise, thereby continuously changing the mass of the attenuation body along the optical axis of an incident spectrum time-wise.

If the attenuation body is gas, for example, the mass changing means can continuously change the mass of the attenuation body along the optical axis of the incident spectrum time-wise by continuously changing the density of the attenuation body time-wise, that is, by continuously changing the pressure of the gas.

Further, if the attenuation body is liquid or gas, a detector that is movable in the optical axial direction may be mounted in a vessel, to continuously change the length of the optical axis that passes through the liquid or the gas, thereby continuously changing the mass of the attenuation body along the optical axis of the incident spectrum time-wise. Thus, the mass changing means can be used to continuously change the mass of the attenuation body along the optical axis of the incident spectrum time-wise, thereby providing an electromagnetic wave/particle beam spectroscopic instrument capable of performing Laplace transform on the incident spectrum.

Further, the Laplace transform filter includes an attenuation body that attenuates a spectrum in accordance with its own mass, which attenuation body may be made so as to change in mass in a direction intersecting with the optical axis of the incident spectrum, and the detection means may be disposed across the direction intersecting with the optical axis of the incident spectrum.

Thus, the Laplace transform filter includes an attenuation body that attenuates a spectrum in accordance with its own mass, which attenuation body is made so as to change in mass in a direction intersecting with the optical axis of the incident spectrum, and the detection means is disposed across a direction intersecting with the optical axis of the incident spectrum, thereby providing an electromagnetic wave/particle beam spectroscopic instrument capable of performing Laplace transform on the incident spectrum.

Further, it is preferable that in the electromagnetic wave/particle beam spectroscopic instrument, the mass of the attenuation body along the optical axis of the incident spectrum be arranged so as to linearly change in a direction intersecting with the optical axis, and the mass changing means relatively move the Laplace transform filter and the detection means in a direction intersecting with the optical axis.

With this configuration, the mass of the attenuation body along the optical axis of an incident spectrum is arranged so as to linearly change in a direction intersecting with this optical axis and the mass changing means relatively move the Laplace transform filter and the detection means in a direction intersecting with this optical axis, thereby providing an electromagnetic wave/particle beam spectroscopic instrument capable of performing Laplace transform on the incident spectrum.

Further, it is preferable that in the electromagnetic wave/particle beam spectroscopic instrument, the Laplace transform filter comprise a chamber containing an attenuation body made of gas that attenuates a spectrum in accordance with its own density, and the mass changing means continuously change the inner pressure of the chamber time-wise when receiving the spectrum that has undergone Laplace transform.

With this configuration, the Laplace transform filter comprises a chamber containing an attenuation body made of gas that attenuates a spectrum in accordance with its own density, and continuously changes the pressure of the attenuation body at a site of the Laplace transform filter that faces the detection means. As a result, by comprising pressure variation means for continuously changing the density of the gas, it is possible to provide an electromagnetic wave/particle beam spectroscopic instrument capable of performing Laplace transform on the incident spectrum.

Further, it is preferable that in the electromagnetic wave/particle beam spectroscopic instrument, the attenuation body be made of a ferromagnetic body and the instrument further comprise magnetic field creation means for magnetizing the ferromagnetic body by applying a magnetic field that forms a predetermined direction with respect to the optical axis of the incident spectrum and polarized spectrum intensity calculation means for calculating the intensity of a polarized spectrum based on the intensity of the incident spectrum obtained by the inverse Laplace transform means.

Further, it is thus possible to provide an electromagnetic wave/particle beam spectroscopic instrument capable of obtaining each of the polarized components if the absorption coefficient of the attenuation body exhibits dependency on the polarization of an electromagnetic wave/particle beam.

Further, a pinhole is preferably disposed between the detection means and the attenuation body so that transmitted light of the spectrum forms an image on the detection means.

By so doing, the transmitted light forms an image on the detection means through the pinhole, so that the formed image can be detected by the detection means.

Further, the detection means is preferably of a non-cooling type. With this configuration, since the non-cooling type detection means can detect transmitted light, a cooing system is unnecessary, thus enabling reduction of the costs and reduction of the size and weight of the spectroscopic instrument.

According to the present invention, it is possible to capture wide measurement ranges of high counting rates and energy levels for the incident spectrum of electromagnetic waves or particle beams. According to the present invention, it is possible to provide an electromagnetic wave/particle beam spectroscopic method that is not easily deteriorated in spectroscopic capability and is resistant to electromagnetic noise, vibrations, heavy sound, heat and specific particle beams of interest, particle beams other than electromagnetic waves, electric noise due to electromagnetic waves, mechanical destruction, and recoiling of solid constituent atoms and also more resistant to radiation exposure on the detection means than the conventional energy resolving technologies.

The reasons for this are that the Laplace transform filter utilizes a bulk structure incomparably larger than the X-ray wavelength and so is comparably resistant to mechanical destruction and distortion, and further receives a large amount of energy because the incident amount can be large owing to multiple-photon detection. Accordingly, a signal detected by the detection means behind the Laplace transform filter with respect to a high-intensity light source or a high-intensity particle source will be much larger than the electric noise.

Further, as the detection means, a heavy metal having a heavy atomic nucleus or a semiconductor compound can be used, in which case the recoiling of high-speed neutrons has a smaller effect than Si (Li) or Ge, thus enabling suppression of the noise to a comparably low level. The detection means used in the present invention need not be cooled in contrast to a semiconductor detector or an superconducting detector and so needs no maintenance that requires replacement except for the radio-activated ones due to prolonged radiation exposure of the detection means. Further, it can be reduced in size and weight and so can be reduced in costs of replacement and disposal.

Although cooling is unnecessary also in the case of measurement by use of the conventional dispersive crystal or diffractive grating, there is be a problem that a slight displacement in spectroscopic angle caused by vibrations are likely to affect the results of measurement. This is because of an extremely large dispersing ability. Further, the conventional dispersive crystal or diffractive grating is less resistant to radiations. The reason is that the conventional dispersive crystal or diffractive grating employs solid structure required to disperse X-rays that is constituted of atoms in units of one through ten and so is likely to be directly affected by the radiation exposure of the detection means and the recoiling. In contrast, the present invention is not influenced by such vibrations. Further, the present invention is unlikely to be influenced by the radiations.

In such a manner, the present invention reliably ensures performance of the conventional semiconductor detectors, superconducting detectors and crystals, and diffractive gratings without a need of maintenance, even in an environment in which the operations or the performance of the conventional semiconductor detectors, superconducting detectors and crystals, and diffractive gratings. Accordingly, the present invention is greatly expected as an electromagnetic wave/particle beam spectroscopic method for use in high temperature plasma fusion experiments to be conducted in the future.

DETAILED DESCRIPTION OF THE PREFERRED EMBODIMENTS

First Embodiment

A description will be given, with reference to FIG. 1, of the first embodiment in which an electromagnetic wave/particle beam spectroscopic method and an electromagnetic wave/particle beam spectroscopic instrument of the present invention are embodied. Hereinafter, the electromagnetic wave/particle beam spectroscopic instrument is referred to as a spectroscopic instrument simply.

Figure 1:
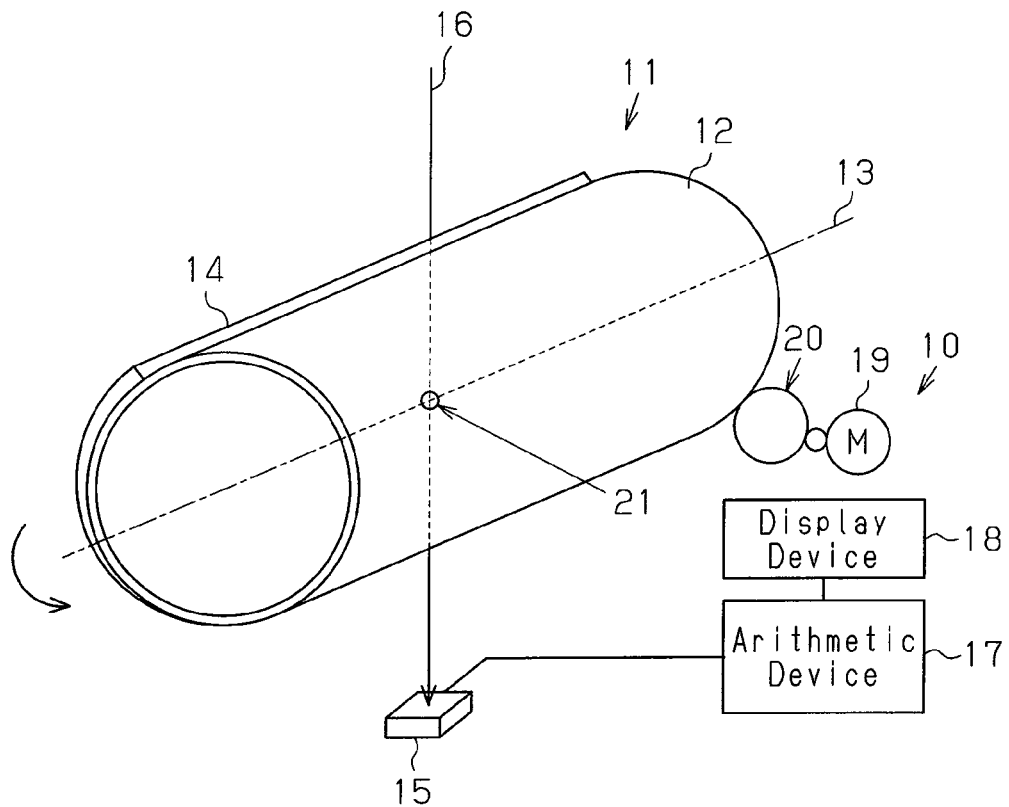
FIG. 1 is a schematic diagram of a spectroscopic instrument according to one embodiment.
Figure 2:
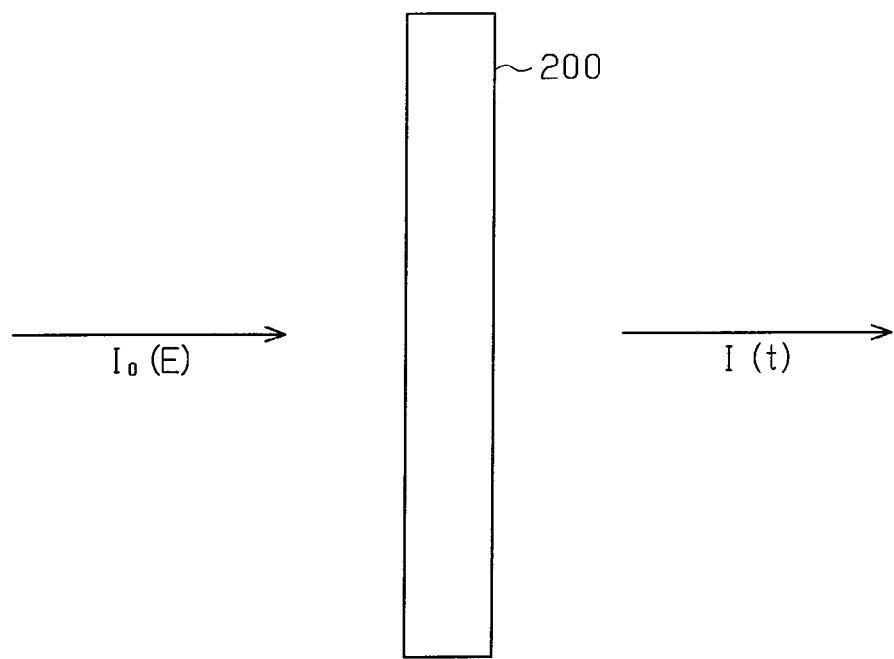
FIG. 2 is an explanatory diagram of transmission of an electromagnetic wave/particle beam through a substance.
Figure 3:
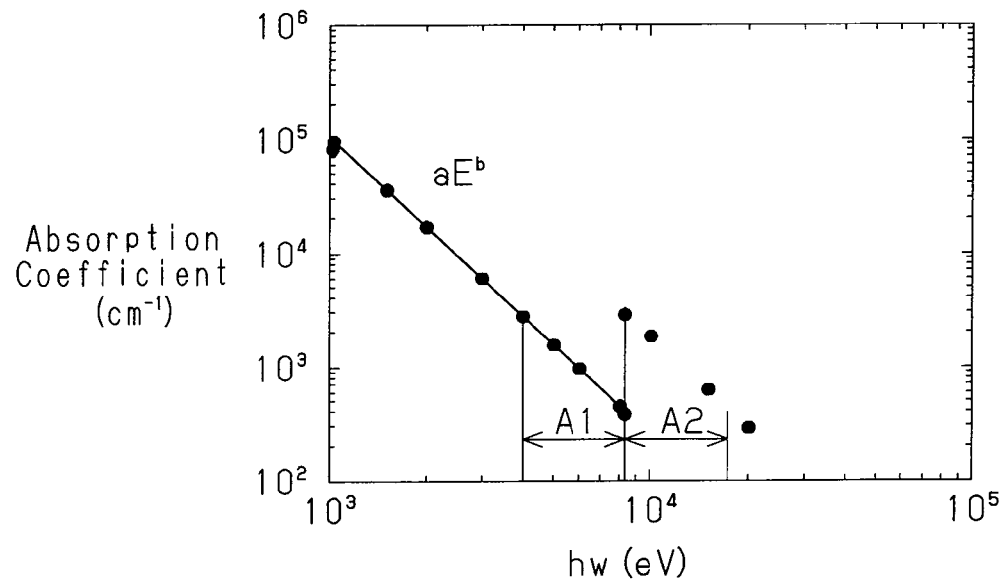
FIG. 3 is a graph showing an absorption spectrum of nickel.

As shown in FIG. 1, a spectroscopic instrument 10 comprises a Laplace transform filter 11, a detection element 15 as detection means, an arithmetic device 17 as inverse Laplace transform means, and a display device 18 as display means. The detection element 15 is disposed on the other side of the Laplace transform filter 11 with respect to a light source. In the present embodiment, the detection element 15 can detect an X-ray.

The Laplace transform filter 11 comprises a cylindrical base body 12 and an attenuation body 14 vapor-deposited on half the circumferential surface of the base body 12. For example, both ends of the base body 12 are supported by bearings (not shown) so as to be rotatable about a rotary axis 13 that is coaxial with the axis of the bearings. Further, the base body 12 is operatively coupled via a motor 19 and a decelerator 20, and rotates at a constant speed about the rotary axis 13 as being driven by the motor 19.

The attenuation body 14 is made of solid metal and vapor-deposited on half the circumferential surface of the base body 12. The attenuation body 14 does not need to be formed on the base body 12 by vapor-depositing but may be formed by any other methods. The type of that metal is selected in accordance with the wavelength or the type of an electromagnetic wave or a particle beam to be measured. For example, the metal used may be copper but not limited thereto. The largest vapor-deposited thickness is in units of 100 μm in a case where transition metal is used as the attenuation body. As the vapor-deposited material as the attenuation body, copper having no absorption edges between 1 keV and 9 eV is most suitable in the case of measuring a characteristic X-ray spectrum of the transition metal.

The vapor-deposited thickness, that is, layer thickness of the attenuation body 14 is arranged in such a manner as to have a constant gradient. The Laplace transform filter 11 is rotated by the motor 19 at a constant angular velocity. As a result, each time that filter rotates once, that is, by 360°, the light can be dispersed twice, because a point with the largest layer thickness and a point with the smallest layer thickness on the attenuation body 14 are separated from each other by 180°.

When the Laplace transform filter 11 thus rotates about the rotary axis 13 at the constant angular velocity, the layer thickness of the attenuation body 14 on an optical axis 16 changes linearly. Specifically, the attenuation body 14 is arranged in such a manner that its layer thickness along the optical axis 16 of an incident spectrum, that is, its mass continuously changes linearly in a direction intersecting with the optical axis 16 as the Laplace transform filter 11 rotates.

The motor 19 rotationally driving the Laplace transform filter 11 corresponds to mass changing means. Further, in the present embodiment the motor 19 is utilized as the mass changing means, but not limited thereto, and any other drive source may be used instead. Although the Laplace transform filter 11 may be rotated by the motor 19 at a constant speed or a variable speed, it may preferably rotate at the constant speed in order to simplify the subsequent arithmetic processing.

Further, as shown in FIG. 1, a pinhole 21 is formed in the attenuation body 14 on the rotary axis 13 and the optical axis. An X-ray spectrum incoming as an electromagnetic wave from the light source (not shown) is narrowed through the pinhole 21 and made incident upon the detection element 15. This pinhole 21 is made in order to form an image on the detection element 15. If images need not be formed, the pinhole 21 can be omitted.

The detection element 15 is constituted of, for example, a semiconductor detector and, specifically, of a charge coupled device (CCD), which is typical as an X-ray detector. In the present embodiment, the detection element 15 corresponds to non-cooling detection means equipped with no cooling device. The present embodiment is different from the conventional energy resolving technologies in that the detection means has no cooling device.

For example, the superconducting detector of the conventional technologies converts the energy of a photon into a rise in temperature. Accordingly, to avoid thermal noise, the conventional superconducting detector needs to set the room temperature to an ultra-low temperature. Thus, the conventional superconducting detector requires a cooling device that uses, for example, liquefied helium. In contrast, the present embodiment is characterized by requiring no large sized cooling device.

The arithmetic device 17 is constituted of a computer and receives the transmitted intensity of an incident spectrum which is detected, that is, measured by the detection element 15. In the present embodiment, a lapse of time in which the rotary axis 13 rotates once, that is, by 360° is set to be a spectroscopic time, namely, a detection time. Therefore, the spectroscopic instrument of the present embodiment rotates once in the spectroscopic time so that the light can be dispersed twice.

The arithmetic device 17 performs inverse Laplace transform on the transmitted intensity of the incident spectrum detected in this spectroscopic time to thereby calculate incident intensity $I_0(E)$ of the incident spectrum made incident upon the Laplace transform filter 11 by using the practical expression (6). The resultant incident spectrum intensity is displayed on the display device 18.

In the case of the present embodiment, in calculation of the characteristic X-ray spectrum intensity, the absorption coefficient α(E) and the energy E are input in advance to the arithmetic device 17 via an input device, such as a keyboard (not shown). As for the level of the energy E, specifically, any value can be arbitrarily selected and input from an energy region having a known absorption coefficient α(E) corresponding to the energy E. For example, in the case of dispersing a characteristic X-ray in steps of 10 eV from 1 keV to 9 keV by using copper, E={1010, 1020, 1030, . . . , 9000} is input. Thus, a region of the energy E of a spectrum to be measured is input beforehand.

The spectroscopic method and the spectroscopic instrument 10 as constituted above have the following characteristics.

(1) According to the spectroscopic method of the present embodiment, at the first step, an incident spectrum of a characteristic X-ray is caused to enter the Laplace transform filter 11 to perform Laplace transform on the intensity of the incident spectrum. In the next second step, the incident spectrum that has passed through the Laplace transform filter 11 to undergo Laplace transform is received, thereby detecting a transmitted intensity of the incident spectrum by using the detection element 15 (detection means). In the following third step, inverse Laplace transform is performed on the detected transmitted intensity of the spectrum, thereby calculating an incident intensity $I_0$ of the spectrum that has entered the Laplace transform filter 11.

As a result, the spectroscopic method of the present embodiment captures a wide range of incident spectra of a characteristic X-ray. Further, advantageously, the spectroscopic capability of the spectroscopic method of the present embodiment is not easily deteriorated, and is resistant to electromagnetic noise, vibrations, heavy sound, heat and specific particle beams of interest, particle beams other than electromagnetic waves, electric noise due to electromagnetic waves, mechanical destruction, and recoiling of solid constituent atoms, and also more resistant to radiation exposure on the detection means than the conventional energy resolving technologies.

(2) According to the spectroscopic method of the present embodiment, the Laplace transform filter 11 is constituted so as to contain the attenuation body 14 that attenuates, that is, absorbs an incident spectrum in accordance with its own mass. Further, at the second step, the mass of the attenuation body 14 along the optical axis 16 of the incident spectrum is changed by using the motor 19 (mass changing means), which continuously changes the mass of the attenuation body 14 along the optical axis 16 of the incident spectrum tinewise.

As a result, it is possible to continuously and linearly change the mass of the attenuation body 14 along the optical axis 16 of the incident spectrum by continuously and relatively moving the Laplace transform filter 11 with respect to the detection element 15 time-wise by using the motor 19. By thus continuously and linearly changing the mass of the attenuation body 14, it is possible to perform Laplace transform on the incident spectrum.

(2) According to the spectroscopic method of the present embodiment, the thickness, namely, the mass, of the attenuation body 14 along the optical axis 16 of an incident spectrum is continuously changed time-wise, thereby performing Laplace transform on the incident spectrum.

(3) According to the spectroscopic method of the present embodiment, the layer thickness, namely, the mass, of the attenuation body 14 along the optical axis 16 of an incident spectrum is arranged so as to linearly, that is, continuously change in a direction intersecting with the optical axis 16. Then, the motor 19 (mass changing means) relatively moves the Laplace transform filter 11 with respect to the detection element 15 (detection means) in a direction intersecting with the optical axis 16. As a result, it is possible to perform Laplace transform on the incident spectrum suitably.

(4) The spectroscopic instrument 10 of the present embodiment comprises the Laplace transform filter 11 that performs Laplace transform on the intensity of an incident spectrum, the detection element 15 that detects a transmitted intensity of the incident spectrum, and the arithmetic device 17 that calculates the incident intensity $I_0$ of the incident spectrum that has entered the Laplace transform filter 11.

As a result, the spectroscopic method of the present embodiment can capture a wide range of incident spectra of a characteristic X-ray. Further, advantageously, the spectroscopic capability of the spectroscopic method of the present embodiment is not easily deteriorated, and is resistant to electromagnetic noise, vibrations, heavy sound, heat and specific particle beams of interest, particle beams other than electromagnetic waves, electric noise due to electromagnetic waves, mechanical destruction, and recoiling of solid constituent atoms and also more resistant to radiation exposure on the detection means than the conventional energy resolving technologies.

(5) The spectroscopic instrument 10 of the present embodiment can capture a wide range of incident spectra of a characteristic X-ray, particularly, of characteristic X-rays of different substances. Further, advantageously, the spectroscopic instrument 10 of the present embodiment provides an electromagnetic wave/particle beam spectroscopic instrument that is not easily deteriorated in spectroscopic capability, and is resistant to electromagnetic noise, vibrations, heavy sound, heat and specific particle beams of interest, particle beams other than electromagnetic waves, electric noise due to electromagnetic waves, mechanical destruction, and recoiling of solid constituent atoms and also more resistant to radiation exposure on the detection means than the conventional energy resolving technologies.

(6) The spectroscopic instrument 10 of the present embodiment continuously changes the layer thickness, namely the mass, of the attenuation body 14 along the optical axis 16 of an incident spectrum by using the motor 19 (mass changing means), thereby providing an electromagnetic wave/particle beam spectroscopic instrument capable of performing Laplace transform on the incident spectrum.

(7) The spectroscopic instrument 10 of the present embodiment is arranged in such a manner that the layer thickness, namely, the mass, of the attenuation body 14 along the optical axis 16 of an incident spectrum linearly changes in a direction intersecting with the optical axis 16, and the motor 19 (mass changing means) relatively moves the Laplace transform filter 11 with respect to the detection element 15 (detection means) in a direction intersecting with the optical axis 16. Therefore, the spectroscopic instrument 10 of the present embodiment provides an electromagnetic wave/particle beam spectroscopic instrument capable of performing Laplace transform on the incident spectrum.

(8) In the spectroscopic instrument 10 of the present embodiment, transmitted light passes through the pinhole 21 to form an image on the detection element 15 (detection means), thus enabling detection of a formed image by using the detection element 15.

(9) The spectroscopic instrument 10 of the present embodiment can detect transmitted light without cooling the detection element 15 and so can be reduced in costs as well as in size and weight without the necessity of a cooling device.

(10) In the present embodiment, the Laplace transform filter 11 can be rotated by means of the motor 19, namely, a drive source, thus dispersing the light twice each time it rotates once. Therefore, by controlling the rotation speed, that is, the angular velocity, the time resolution can be enhanced. Further, as the spectroscopic performance of the Laplace transform filter 11, it is possible to secure both the time resolution and an energy resolution capable of discriminating characteristic X-rays of the elements.

An example of actual calculations will be described.
(Calculation Example)

As described above, an incident spectrum can be obtained using Expression (6), which is a mathematically exact expression. However, the actual analysis is carried out as operations on numerals in a finite region by using a computer and, therefore, integrations in an infinite region of Expression (6) cannot be performed. For this reason, to realize numeric analysis in a finite region, Expression (15) capable of providing finite integration regions is employed in place of Expression (6). As indicated by Expression (16), Expressions (6) and (15) are mathematically equal in a case where the arithmetic region parameter σ is 0. "σ" is a parameter that determines an arithmetic region and σ=0 means that the arithmetic region is infinite.

Expression (15)

$$I_\sigma(E) \equiv -\frac{1}{2\pi i f(E)} \frac{d}{dE} \ln\alpha(E) \int_{c-i\infty}^{c+i\infty} ds e^{(\frac{\sigma}{2})^2} \frac{g(s)}{G(s)}$$

Expression (16)

$$I_0(E) = \lim_{\sigma \to 0} I_\sigma(E)$$

If the incident spectrum F(E) is given by the delta function $\delta(E-E_0)$, Expression (17) is obtained. If the σ-dependency of the analysis results is obtained using incident light whose spectrum is known, Expression (18) is obtained.

Expression (17)

$$F(E) = \int_0^\infty dE_0 F(E_0)\delta(E-E_0)$$

Expression (18)

$$I_\sigma(E) = \int_0^\infty dE_0 \frac{F(E_0)}{\sqrt{\pi}\sigma} \frac{f(E_0)}{f(E)} \frac{dX}{dE_0} e^{Xc} e^{-(\frac{X}{\sigma})^2}$$

Expression (19)

$$(\because X \equiv \ln\alpha(E) - \ln\alpha(E_0))$$

If the arithmetic region parameter σ is set to 0, Expression (20) is obtained from Expression (18).

Expression (20)

$$I_0(E) = \int_0^\infty dE_0 F(E_0) \frac{f(E_0)}{f(E)} \frac{dX}{dE_0} \delta(X)$$

Further, if X decreases or increases monotonously, Expression (21) is obtained from Expression (20), so that $I_0(E)$ is equivalent to F(E) indicated by Expression (17).

Expression (21)

$$I_0(E) \equiv \int_0^\infty dE_0 F(E_0)\delta(E-E_0)$$

Figure 4:
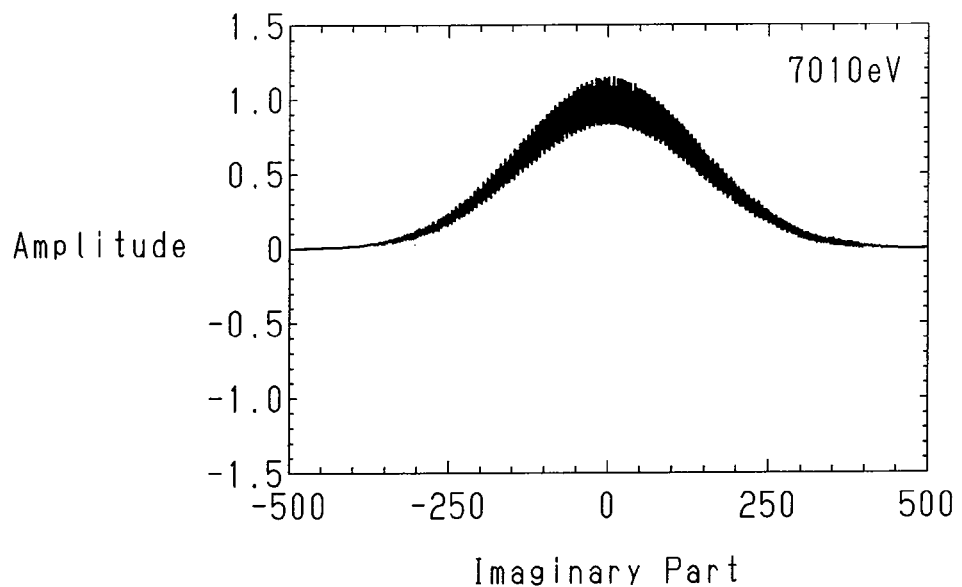
FIG. 4 is an explanatory graph of an analysis region in a case where $\sigma=0.01$.

As described above, although σ=0 means that the arithmetic region is infinite, a displacement of the analysis result $I_0(E)$ from the incident spectrum F(E) caused by providing a finite arithmetic region can be evaluated using Expression (18). The relationship of σ=0.01 gives an arithmetic region of ±500 (see FIG. 4).

Figure 5:
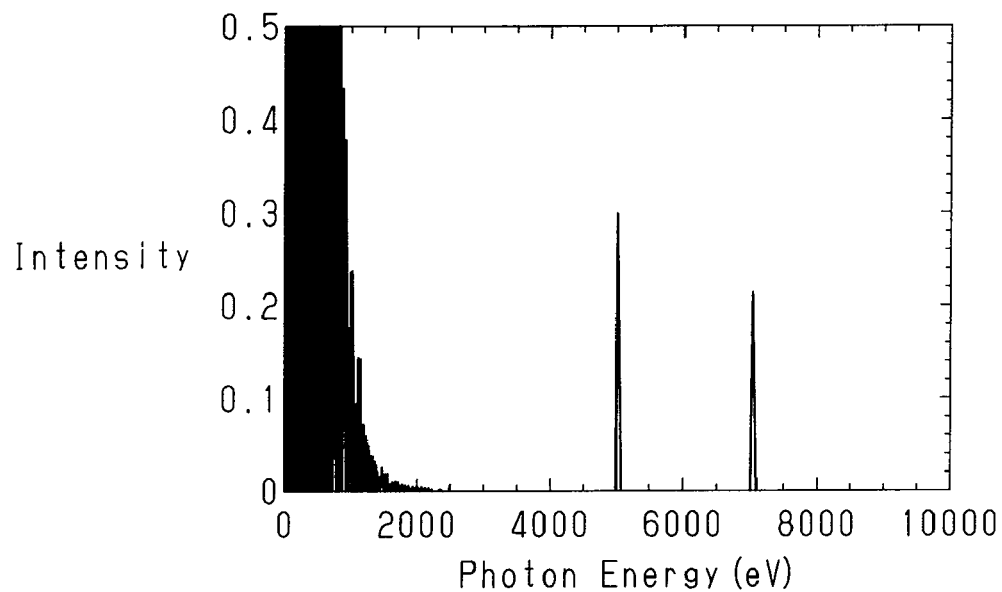
FIG. 5 is a graph of dispersion through a Laplace transform filter.
Figure 6:
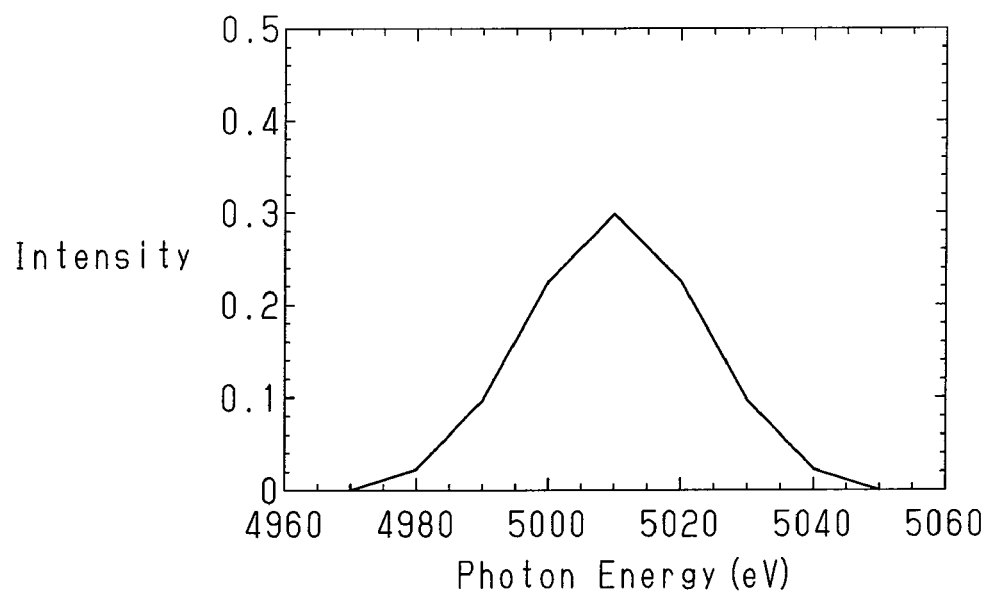
FIG. 6 is an enlarged view of FIG. 5.
Figure 7:
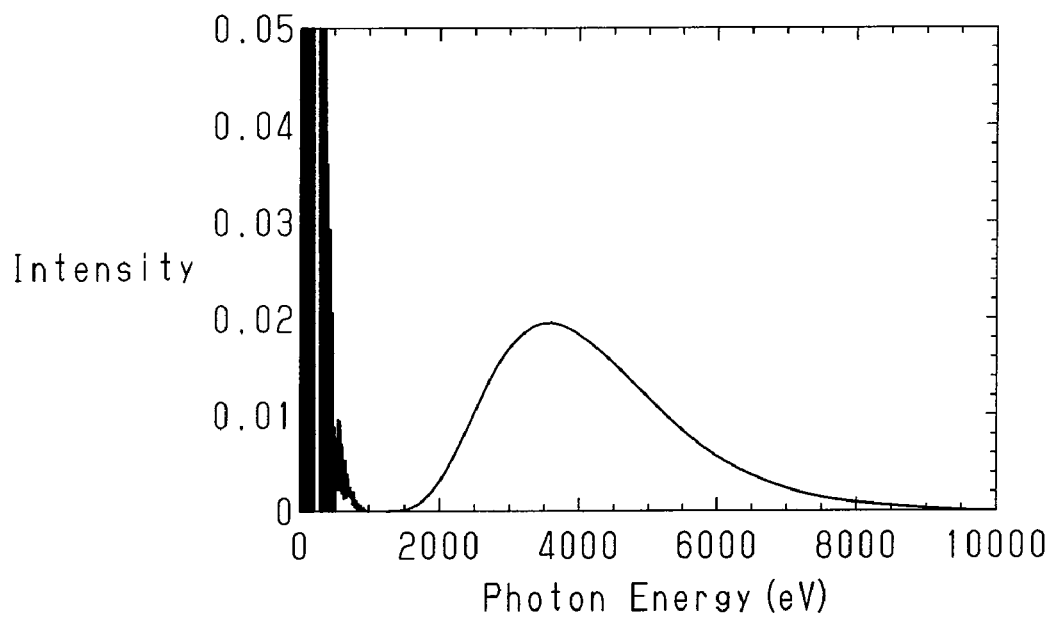
FIG. 7 is a graph of dispersion showing results of analysis in a case where $\sigma$ is increased.

FIG. 5 shows the results of analysis by use of an ordinary personal computer on the assumption of σ=0.01. FIG. 6 is an enlarged view of FIG. 5 near a portion of 5000 eV. The incident spectra to be used are assumed to be two line spectra with 5010 eV and 7010 eV having infinitely small line widths and the same intensity. As is apparent from FIG. 6, as a result of setting σ to a finite value and providing a finite arithmetic region, the post-analysis line widths are rendered finite. The line widths are thus rendered finite owing to the term of exp$[-(X/\sigma)^2]$ in Expression (18). The term of exp(X/c) in Expression (18) shows that if the arithmetic region parameter σ is set to a too large value, the analysis results will not reproduce the energy or the intensity of the incident line spectrum (see FIG. 7).

The relationship of a line width and an energy position with an absorption coefficient in the analysis results is obtained from Expression (18). By assuming an integrand of Expression (18) to be Kσ(E) and performing Taylor expansion on X around $E-E_0$, Expression (23) is obtained.

Expression (22)

$$K_\sigma(E) = \frac{F(E_0)}{\sqrt{\pi}\sigma} \frac{f(E_0)}{f(E)} \frac{dX}{dE_0} e^{Xc} e^{-(\frac{X}{\sigma})^2}$$

Expression (23)

$$K_\sigma(E) \cong -\frac{I_0}{\sqrt{\pi}\sigma} \frac{f(E_0)}{f(E)} \beta(E_0) e^{c\beta(E_0)(E-E_0)} e^{-[(\frac{\sigma}{\beta(E_0)})^{-1}(E-E_0)]^2}$$

Assuming a read error in line width caused by finite analysis to be ΔE, Expression (24) is obtained through the term of a Gaussian function in Expression (23).

Expression (24)

$$\Delta E = \frac{\sigma}{\beta(E)}$$

In the present calculation example, the absorption coefficient of the substance in the X-ray region is $\alpha(E)=aE^{-b}$ and in a case where nickel is selected as the attenuation body, b=2.63. This leads to $\beta(E)=-b/E$, so that assuming σ=0.01, E/ΔE=263 is given. Therefore, it is possible to obtain a relative error in reading from a relative change in absorption coefficient with respect to energy and a range subject to numeric calculations. However, the relative read error in Expression (24) is a limit value due to numeric calculations. To realize the limit value, calibration experiments are preferably conducted using a high-resolution monochromatic light source having an extremely narrow spectrum width.

The resolution of the conventional energy continuously-variable monochromatic light source is about E/ΔE=8000, which is larger by at least one digit than that at the time of performing numeric calculations on an analysis in the present calculation example by using an ordinary personal computer, thus enabling calibration experiments to be conducted actually. FIG. 5 shows a calculation example based on the assumption that Laplace transform is performed on an incident spectrum of a photon by using the Laplace transform filter 11. In the figure, the horizontal axis represents photon energy, and the vertical axis represents spectrum intensity.

The present calculation example is about two line spectra having the equal infinitely narrow intensities between 5010 eV and 7010 eV. That is, in FIG. 5, a line width corresponding to the resolution is 40 eV. Therefore, since it is assumed that the detection element 15 measures the number of photons, the detection efficiency f(E) is set to be 1. In actual calculations, integrations provide a finite sum. Thus, there are some cases where intensity remains in a region free of line spectrum that must disappear due to complete interference in a precise sense.

Calculation conditions for this calculation example include that an interval between 0 keV and 10.0 keV is evenly divided by 100, and the layer thickness of the attenuation body in the filter is evenly divided by 10000.

Second Embodiment

Since the present embodiment employs almost the same hardware configuration as the first embodiment, identical reference numerals are given to identical components.

The second embodiment involves obtaining polarized components of an incident spectrum in a case where the absorption coefficient of an attenuation body exhibits dependency on the polarization of an electromagnetic wave or a particle beam.

Figure 19:
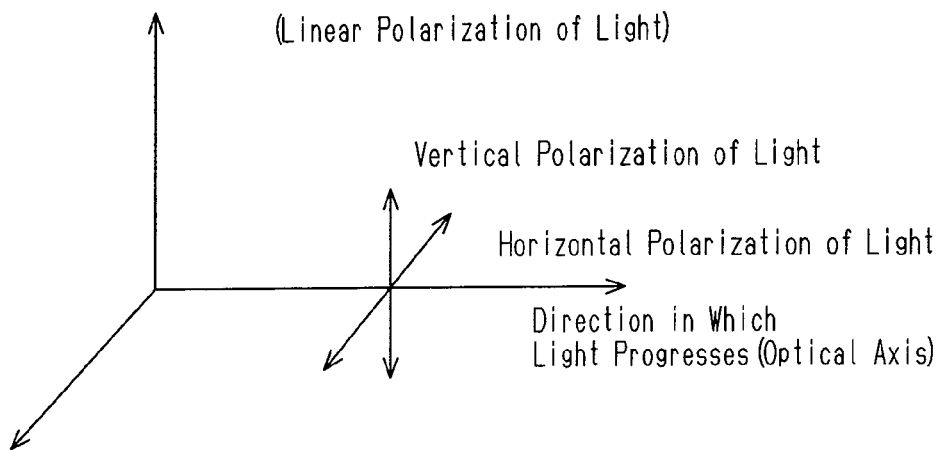
FIG. 19 is an explanatory diagram of vertical polarization and horizontal polarization in the case of linear polarization.
Figure 20:
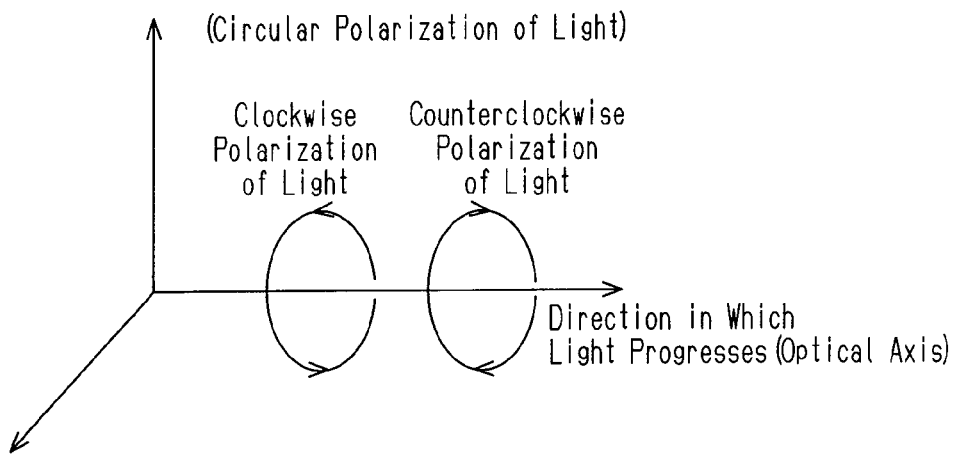
FIG. 20 is an explanatory diagram of clockwise and counterclockwise rotations in the case of circular polarization.
Figure 21:
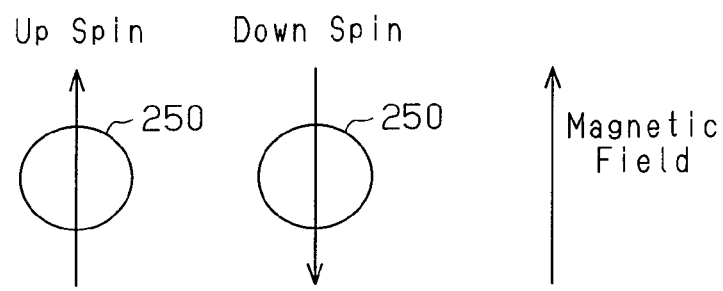
FIG. 21 is an explanatory diagram of up spin and down spin in particles.

Linear polarization of light comes in vertical polarization and horizontal polarization with respect to a light progressing direction, that is, with respect to an optical axis as shown in FIG. 19, and its components can be measured as polarization. Further, in the case of circular polarization of light, there are, as shown in FIG. 20, clockwise polarization and counter-clockwise polarization about the light progressing direction, that is, about the optical axis, and the clockwise and counter-clockwise components can be measured as polarization. In the case of particle beams, as shown in FIG. 21, probabilities can be estimated of up spin and down spin of an incident particle 250 in a condition where a magnetic field is applied.

Figure 22:
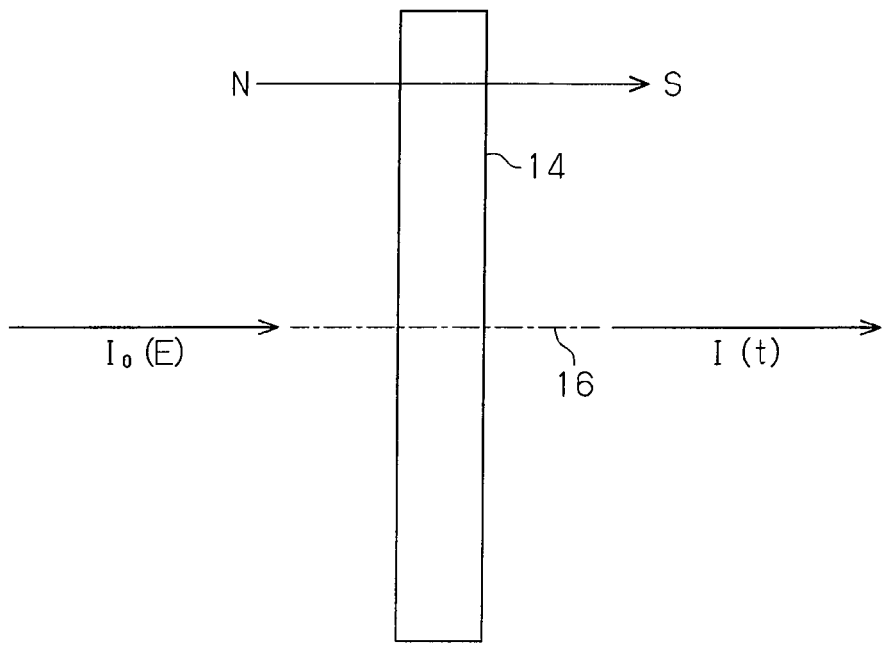
FIG. 22 is an explanatory diagram of application of a magnetic field in the case of a magnetic circular dichroism.
Figure 23:
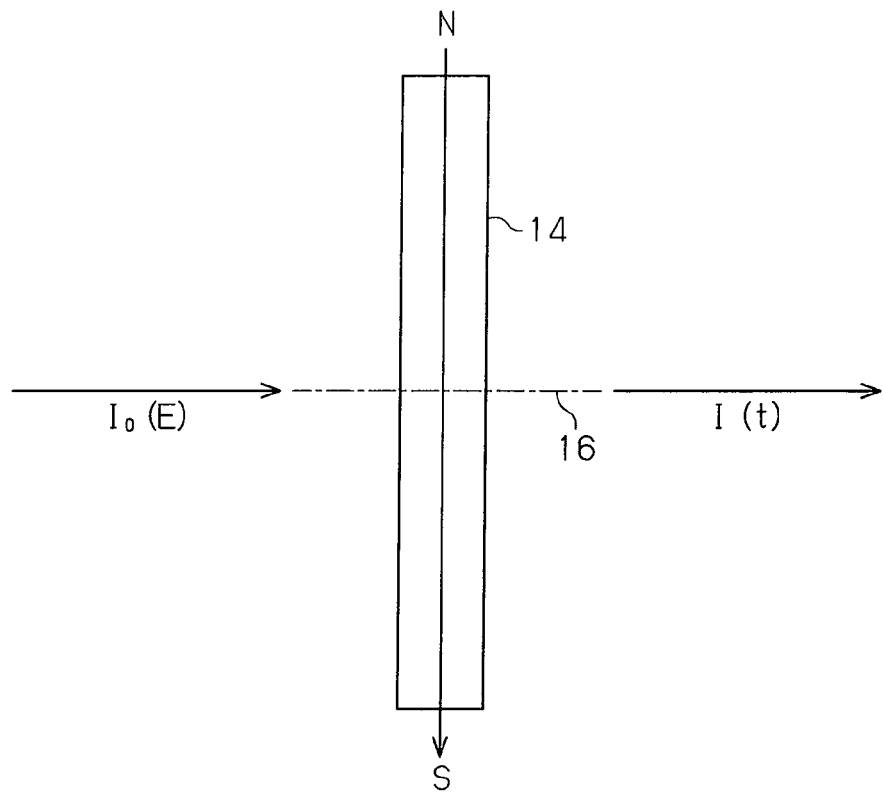
FIG. 23 is an explanatory diagram of application of a magnetic field in the case of a magnetic linear dichroism.

Magnetic field creation means can be constituted of a permanent magnet or an electric magnet. FIGS. 22 and 23 show an example of incident photons.

As shown in FIG. 22, there is a case where the magnetic creation means is disposed so as to form such a magnetic field that the incident side is the N-pole and the emergent side is the S-pole, and applied in the same direction as the optical axis 16 of the incident spectrum.

Further, as shown in FIG. 23, there is a case where the magnetic creation means is disposed so that the N-pole and the S-pole are perpendicular to the optical axis 16 of the incident spectrum, thereby applying a magnetic field perpendicularly to the optical axis 16.

The direction in which a magnetic field, namely, a steady magnetic field is applied to the optical axis, that is, the same direction as the optical axis and the direction perpendicular to the optical axis 16 correspond to predetermined directions of claims 5 and 10, respectively.

Accordingly, in the second embodiment, nickel serving as a ferromagnetic body exhibiting dependency on the polarization of electromagnetic waves/particle beams is vapor-deposited as an attenuation body 14 on a base body 12. The attenuation body 14 is formed to have the same layer thickness as the first embodiment. Besides nickel, gadolinite and the like may be employed as the ferromagnetic body; however, of course, other ferromagnetic bodies than nickel and gadolinite may be employed instead.

In the second embodiment, an arithmetic device 17 calculates a polarized spectrum by using Expression (11) based on a transmitted intensity $J_\pm(t)$ detected by a detection element 15. The arithmetic device 17 corresponds to polarized spectrum intensity calculation means.

Expression (11) is based on Expressions (12) to (14) and inverse Laplace transform, that is, practically, Mellin transform is performed in Expression (11). Further, the transmitted intensity $J_\pm(t)$ is a Laplace transform expression for an incident intensity, which is shown by Expression (14).

Also in the second embodiment, like the first embodiment, the arithmetic device 17 is previously supplied with the absorption coefficient α(E) and the region of energy E of a spectrum to be measured via an input device (not shown).

(About Method for Reversing Polarity in Polarization Measurement)

A method of reversing a polarity in polarization measurement will be described.

By applying a steady magnetic field in the progressing direction of an incident photon, that is, the same direction as the optical axis 16 as shown in FIG. 22 or in a direction perpendicular to the progressing direction of the incident photon, that is, a direction perpendicular to the optical axis 16 as shown in FIG. 23, the attenuation body 14, which is a ferromagnetic body, is magnetized to then perform a first Laplace transform. Then, a second Laplace transform is performed by reversing the direction of the steady magnetic field by 180° in a condition where the intensity of the magnetic field is kept constant. The results of these have the reversed polarity and can give $J_\pm(t)$ in Expression (14). In this case, the incident photon refers to any photon other than, for example, the particle beams and the X-rays. If the steady magnetic field is applied in the same direction as the optical axis of the incident photon, circular polarization of light can be identified by magnetic circular dichroism as shown in FIG. 22. Here, polarity reversal refers to reversing the magnetic field by 180°. The incident spectrum intensity must be constant during the first and second dispersions. Further, if the steady magnetic field is applied perpendicular to the optical axis of the incident photon, linear polarization of light is identified by magnetic circular dichroism as shown in FIG. 23.

To check the proportion between vertical polarization of light and horizontal polarization of light, the following is performed as an exception of magnetic field reversal.

(Exception of Magnetic Field Reversal)

Magnetic linear dichroism can be utilized to disperse light by distinguishing between vertical polarization and horizontal polarization of the light. These vertical polarization and horizontal polarization of the light have their plane of polarization shifted by 90° as shown in FIG. 19.

First, by applying a steady magnetic field perpendicular to the progressing direction of an incident spectrum, that is, the optical axis as shown in FIG. 23 to thereby magnetize the attenuation body, which is a ferromagnetic body, thus performing first Laplace transform. Then, the second Laplace transform is performed by reversing the direction of the steady magnetic field by 90° about the optical axis in a condition where the intensity of the magnetic field is kept constant. The results of these have the reversed polarity and can give $J_\pm(t)$ in Expression (14). The incident spectrum intensity must be constant during the first and second dispersions.

It is thus possible to identify polarization of light based on magnetic circular dichroism or magnetic linear dichroism by using nickel, which is a ferromagnetic body, as the attenuation body 14.

The spectroscopic method and the spectroscopic instrument 10 as constituted above have the following characteristics.

(1) According to the spectroscopic method of the second embodiment, if at the fourth step, the absorption coefficient $\alpha(E)$ of the attenuation body 14 exhibits dependency on the polarization of electromagnetic waves or particle beams, polarized components are obtained respectively. Therefore, if dependency is observed on the polarization of electromagnetic waves or particle beams, the polarized components can be obtained respectively.

(2) In the second embodiment, an electromagnetic wave/particle beam spectroscopic instrument can be provided which, if the absorption coefficient $\alpha(E)$ of the attenuation body 14 exhibits dependency on the polarization of electromagnetic waves or particle beams, can obtain each of the polarized components.

(Application Example)

An application example will be described with reference to FIGS. 8 to 11.

Figure 8:
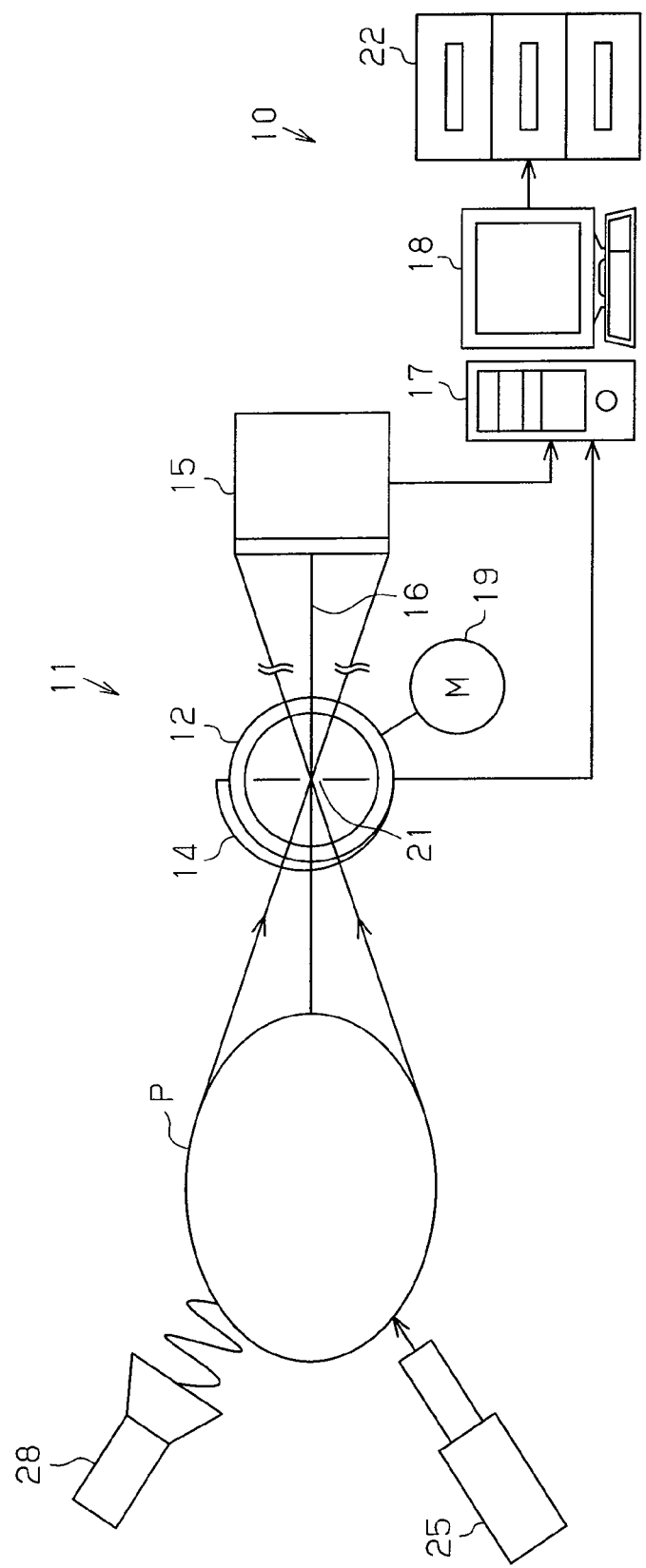
FIG. 8 is a schematic layout of a measurement instrument for the purpose of showing an example of application by dispersion of a plasma X-ray and evaluating transport of impurity particles.

The application example includes measurement of an X-ray in large helical device in the National Institute for Fusion Science. FIG. 8 is a schematic layout of the spectroscopic instrument 10 for the purpose of evaluating the transport of impurity particles. Identical reference numerals are given to the same components as the first embodiment. In the application example, a one-dimensional semiconductor array, namely, a one-dimensional multi-element type detector is employed as the detection element 15. Reference numeral 22 in the figure indicates a storage device connected to the arithmetic device 17.

Plasma in Large Helical Device (not shown) has a high emissivity of characteristic X-rays, so that if the one-dimensional multi-element type detector of the detection element 15 is used as a spectroscopic instrument 10, it is possible to have the energy resolution, the space resolution, and the time resolution simultaneously, thus performing transport evaluation. In FIG. 8, the large helical device (not shown) is provided with an impurity injection device 25 for injecting an impurity such as argon to plasma P heated by a heating device 26.

In this application example, the spectroscopic instrument 10 can measure a change in time of an X-ray spectrum space distribution, result of which can be utilized in the evaluation of impurity transport. The plasma P is shaped like a torus, so that a transport distribution can be evaluated in a radial direction from the cross-sectional center toward the outermost shell.

Figure 9:
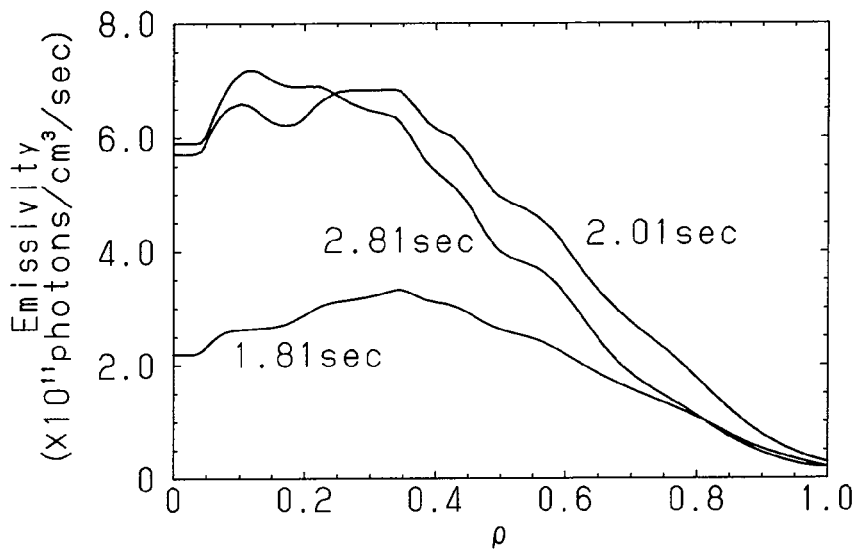
FIG. 9 is a graph showing an emissivity radial distribution of characteristic X-rays of argon.
Figure 10:
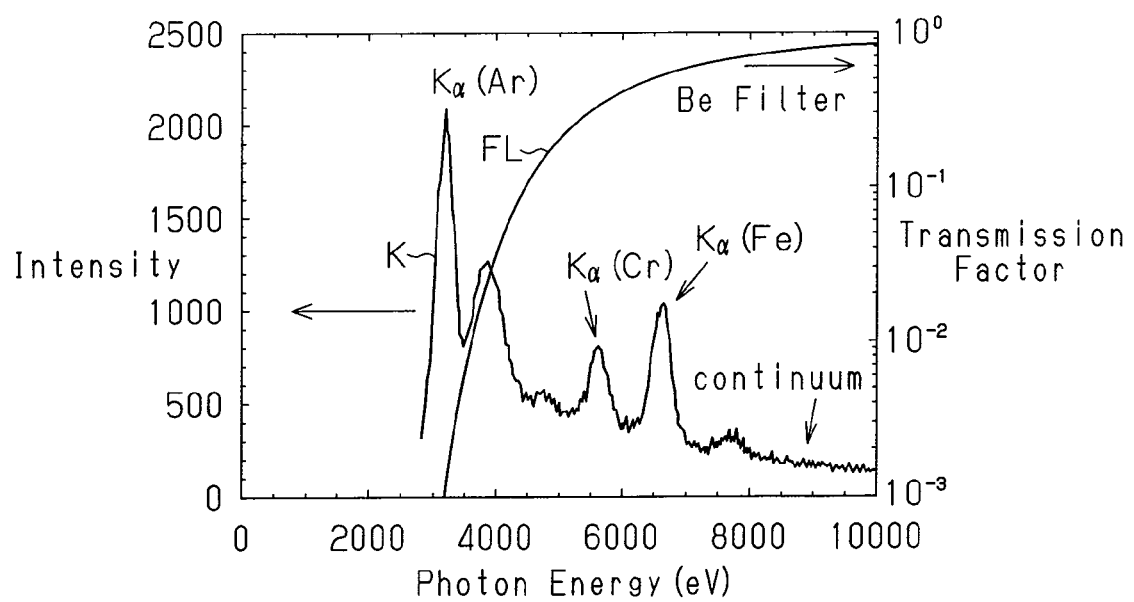
FIG. 10 is a graph showing a spectrum of an X-ray emitted from plasma.
Figure 11:
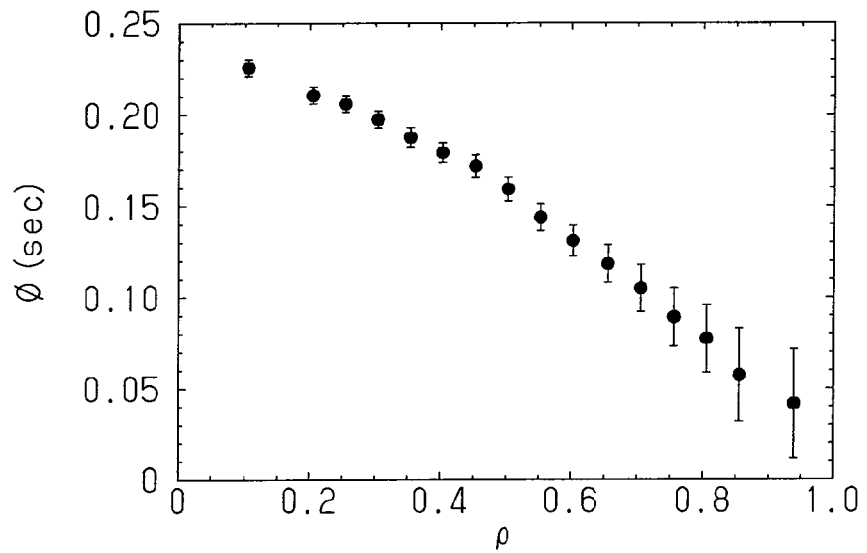
FIG. 11 is a graph showing a radial distribution of actually measured argon arrival time.

FIGS. 9 to 11 show data obtained by the conventional methods.

FIG. 9 shows an emissivity radial distribution of argon characteristic X-rays (3.2 keV) radiated from typical plasma in the large helical device. Its horizontal axis indicates a standardized diameter coordinate of plasma, in which 0 corresponds to the center of the plasma and 1 corresponds to the outermost shell of the plasma. An argon gas injected toward the center of the plasma P at a point in time of 1.5 s is gradually diffused toward the center from the outermost shell of the plasma P. During the measurement, an electron temperature distribution is constant and the X-ray intensity is proportional to the absolute amount of argon. "Radial" refers to a coordinate going from the cross-sectional center to the outermost shell of the torus-shaped plasma P. As shown in FIG. 9, at the highest intensity, the X-ray emissivity comes near $10^{12}$ photons/cm$^3$/s and, at an energy resolution of 150 eV, the time resolution can be about 10 ms.

FIG. 10 shows a spectrum of an X-ray radiated from typical plasma in the large helical device, which is measured using the conventional semiconductor X-ray pulse-height analyzer.

An X-ray spectrum of 2.5 keV through 10 keV radiated from typical plasma generated in the large helical device is indicated by K. Besides continuous spectra due to bremsstrahlung emitted from electrons, characteristic X-rays are measured of argon and transition metals contained in the plasma as an impurity. Particularly, transition metals Cr and Fe whose atomic numbers are different from each other by 2 have characteristic X-rays which are separate from each other by approximately 1 keV.

Conventionally, a semiconductor X-ray pulse-height analyzer has been used as the detector and had a limited count rate, so that a beryllium flat plate filter having a thickness t of 1 mm and a plate having a pinhole with a diameter of 0.5 mm are arranged separately from each other in series along the optical axis and used as a collimator to significantly lower the intensity of an incident light. In FIG. 10, FL indicates the transmission rate of the beryllium flat plate filter. If corrected with the absorption coefficient of the beryllium flat plate filter, an actual characteristic X-ray intensity of argon is larger than Fe (iron) by at least two digits. In the case of FIG. 10, it is possible to sufficiently distinguish between the characteristic X-rays of transient metals having adjacent atomic numbers at an energy resolution of 500 eV.

FIG. 11 shows a distribution of arrival times required by a particle necessary for quantitative evaluation of transport to reach the respective radial positions from the outermost shell of the plasma P. In the figure, the horizontal axis represents a space axis and the vertical axis represents a time axis, thus telling that the measurement device must simultaneously have the space resolution and the time resolution besides the energy resolution. As shown in FIG. 11, parabolic dependency is observed on the diameter of the plasma P. The closer to the outermost shell of the plasma P, the lower the electron temperature and the weaker the characteristic X-ray intensity. Accordingly, the measurement accuracy lowers.

Here, transport evaluation means to obtain a diffusion coefficient and a convection velocity, which are dependent on the gradient of arrival times, so that it is necessary to set a great number of measurement points for the space and time as shown in FIG. 11.

Conventionally, since the X-ray pulse-height analyzer has been used in transport evaluation, the time resolution and the space resolution cannot be improved simultaneously; therefore, plasma under the same discharge conditions is created about 10 times to measure the radial distribution of arrival times. In the case of the X-ray pulse-height analyzer, due to its limited counting rate, the beryllium flat plate must be used to lower the spectrum intensity on the side of low energy, where the electron bremsstrahlung intensity is particularly high. As shown in FIG. 10, the argon characteristic X-ray has a low energy level of 3.2 keV, and the intensity lowered by two digits. Actually, an SN ratio in FIG. 11 is lowered to $\frac{1}{10}$, that is, the square root of $\frac{1}{100}$ due to a deficiency in count rate of the X-ray pulse-height analyzer.

The spectroscopic instrument 10 of the application example uses a Laplace transform filter and so need not have a flat plate filter, which lowers at least an incident intensity, thereby enabling performing transport evaluation at an SN ratio of at least 10 (that is, the square root of 100) times that of the X-ray pulse-height analyzer.

Particularly, the transport analysis accuracy is improved at the peripheries of the plasma. Further, transport evaluation can be conducted in only one discharge by using a high-time resolution multi-element type detector.

(Method for Creating Laplace Transform Filter)

A method for creating a Laplace transform filter will be described with reference to FIG. 12.

Figure 12:
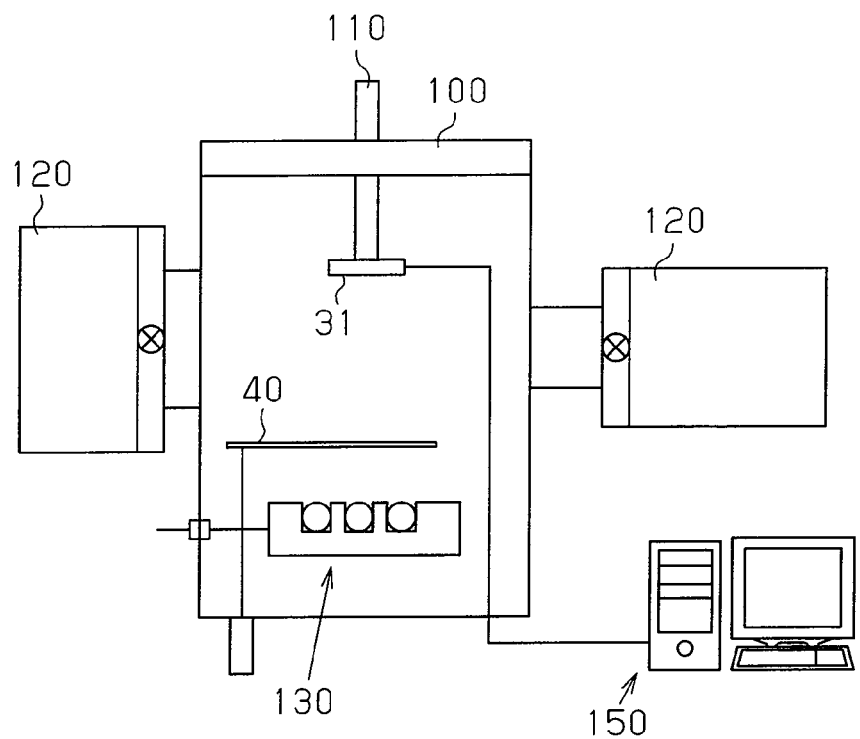
FIG. 12 is a schematic diagram of an apparatus for creating the Laplace transform filter.

As shown in FIG. 12, this Laplace transform filter uses a disc-shaped vapor deposition platform 31 as its base.

An ultrahigh vacuum chamber 100 is equipped at its upper part with a substrate cooling holder 110 which is driven rotationally by a motor (not shown), and can be vacuumed so as to reach an ultrahigh vacuum condition. Further, the ultrahigh vacuum chamber 100 is equipped with an air lock 120, which enables the contents inside to be taken out. An ultrahigh vacuum means a vacuum atmosphere that reaches, for example, $10^{-8}$ Pa.

The disc-shaped vapor deposition platform 31 is held by the substrate cooling holder 110 in the ultrahigh vacuum chamber 100 and has its semicircular portion covered by a shutter 40. In this condition, an operator drives the motor (not shown) to thereby half-rotate the substrate cooling holder 110 at a constant speed about the center of the disc-shaped vapor deposition platform 31. In this case, the rotary driving of the motor is controlled by a vapor deposition drive control device 150.

During this half-rotation, evaporated transition metal from an electron beam evaporation furnace 130 provided in the ultrahigh vacuum chamber 100 is vapor-deposited onto the portion not covered by the shutter 40, thus creating a Laplace transform filter whose vapor-deposited film thickness continuously changes in this rotating direction. That is, on the semi-circular portion of the disc-shaped vapor deposition platform 31, a film is formed whose vapor-deposited thickness continuously changes in the rotating direction.

A point on the completed Laplace transform filter where the layer thickness of the attenuation body is the smallest and a point on that filter where the thickness is the largest are separated from each other by 180° in the rotating direction, so that each time this Laplace transform filter is rotated once, that is, by 360°, light can be dispersed twice. The largest vapor-deposited thickness comes in units of 100 μm in a case where transition metal is employed as the material.

As the deposited material, copper having no absorption edges between 1 keV and 9 keV is most suitable in the case of measuring a characteristic X-ray spectrum of the transition metal; however, the present invention is not limited to copper.

(Example of Laplace Transform Filter)

An example of the Laplace transform filter will be described.

Figure 13:
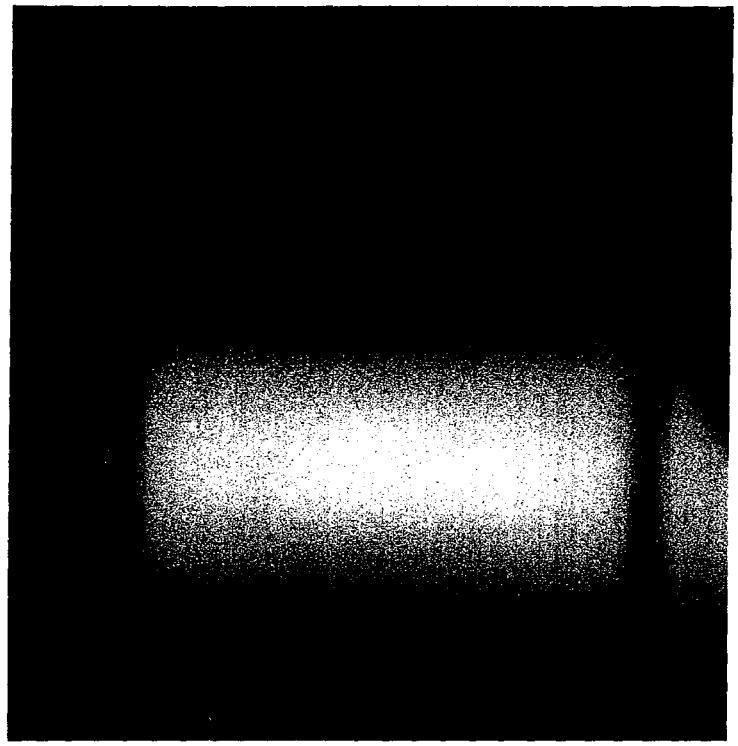
FIG. 13 is an image picked up by a hard X-ray using a typical CCD in a comparative example.

FIG. 13 is an image picked up in a case where ordinary hard X-rays of the Peltier cooling specifications which was sensitive in hard X-rays of 20 keV or higher were used as an X-ray detector. A subject was photographed by using plasma in Large Helical Device as an X-ray source, thus providing a comparative example.

Figure 14:
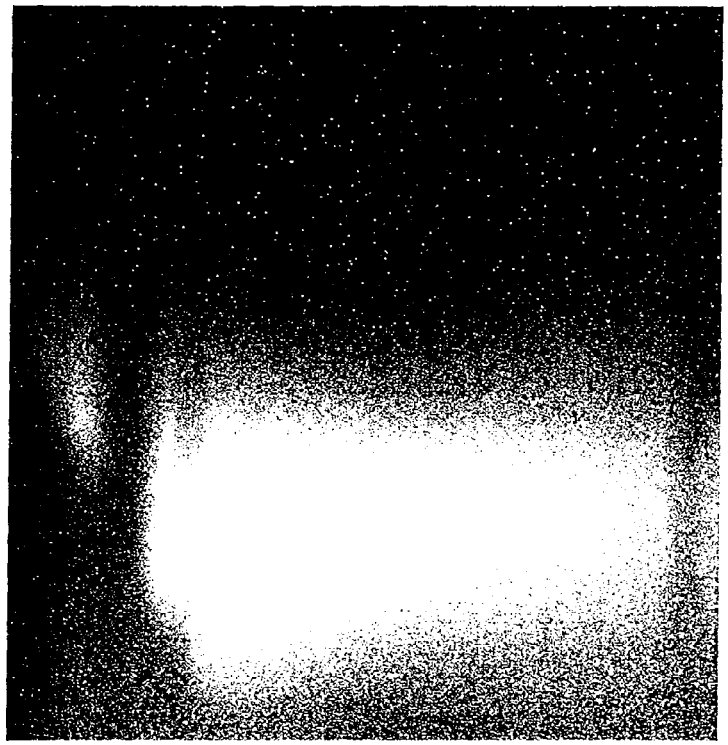
FIG. 14 is an image obtained by performing Laplace transform on an X-ray spectrum.

FIG. 14 is an image obtained by photographing the same subject as the comparative example through the Laplace transform filter.

The hard X-ray intensity of at least 20 keV of the plasma light source in this example was originally weak, and the data shows that the transmitted intensity weakened as the filter thickness increased. However, it was observed that even with a low-intensity signal conversely, X-ray spectrum was measured stably also with a sufficient space resolution even without countermeasures against electromagnetic noise and vibrations at all.

In the example, the Laplace transform filter measured 50×30 mm² and the attenuation body was made of aluminum and created by shaving. In this case, the attenuation body was as thick as 50 to 500 μm.

In FIGS. 13 and 14, vertical lines photographed laterally are frames of a window for checking the plasma visually.

Third Embodiment

Figure 15:
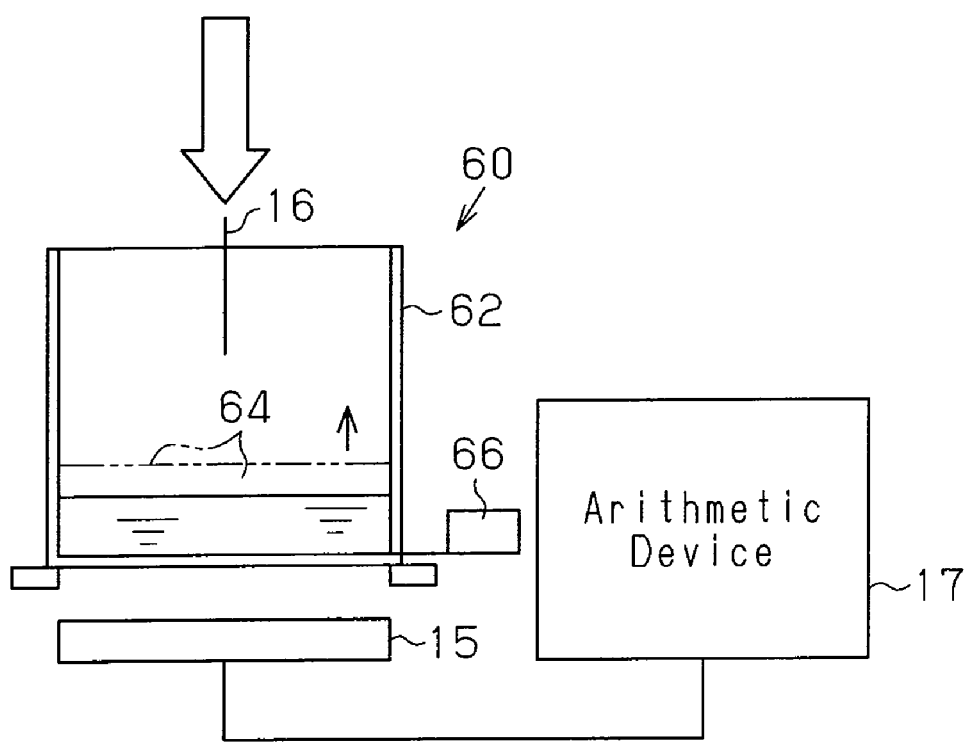
FIG. 15 is a schematic diagram of an electromagnetic wave/particle beam spectroscopic instrument according to a third embodiment.

Next, a third embodiment will be described with reference to FIG. 15. The following embodiments including this embodiment have different configurations of the Laplace transform filter, so that identical reference numerals are given to the same components as the first embodiment, and repetitive description on the identical components will be omitted. In the following embodiments including the present embodiments, the display device 18 is omitted for ease of explanation in FIGS. 15 to 17.

A Laplace transform filter 60 comprises a package 62 that contains liquid 64 as an attenuation body. Preferably, the package 62 is of the same cross-sectional shape in the height direction, such as a rectangular solid, a cube, or a cylinder. Then, into the package 62, the liquid 64 can flow through a pump 66 at a constant flow rate per second.

As the attenuation body, the liquid 64 may be gallium and the like; however, the present invention is not limited to these.

The present embodiment defines spectroscopic time as a lapse of time in which the liquid 64 is poured into the package 62 from height 0 to a predetermined height. During this lapse of time, Laplace transform is performed on the intensity of an incident spectrum. In the third embodiment, the pump 66 corresponds to the mass changing means. Arithmetic calculations performed by the arithmetic device 17 are the same as the first embodiment, and repetitive description will be omitted. In this case, "t" reads not as the thickness of the attenuation body, but as the depth of the liquid serving as the attenuation body in Expressions (6), (7), (8), and (9), which are practical expressions.

Fourth Embodiment

Figure 16:
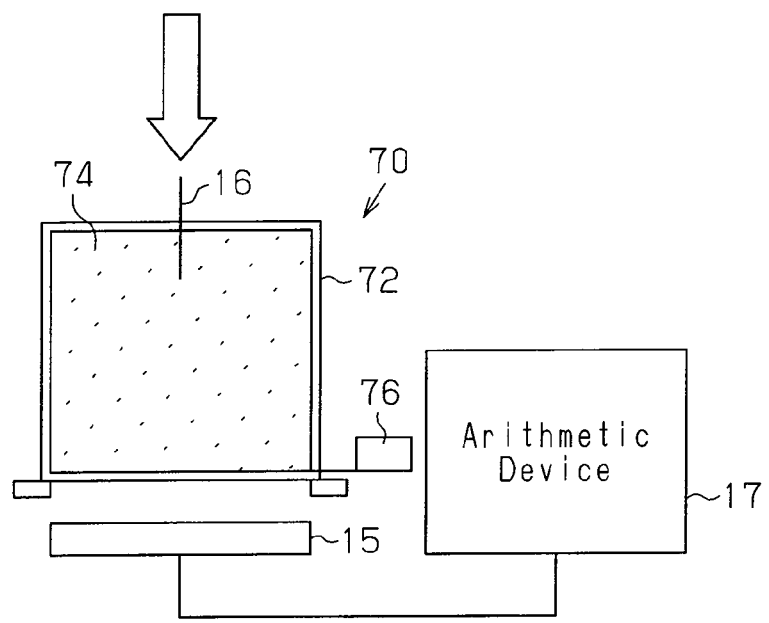
FIG. 16 is a schematic diagram of the electromagnetic wave/particle beam spectroscopic instrument according to a fourth embodiment.

Next, a fourth embodiment will be described with reference to FIG. 16.

A Laplace transform filter 70 comprises a package 72 that hermetically contains gas 74 as an attenuation body. Preferably, the package 72 has a flat-plate bottom wall and be of the same cross-sectional shape in the height direction, such as a rectangular solid, a cube, or a cylinder. The package 72 corresponds to the chamber. Then, into the package 62, the gas 74 as the attenuation body can flow through a pump 76 at a constant flow rate per second. The pump 76 corresponds to the pressure variation means.

As the attenuation body, the gas 74 may be argon and the like; however, the present invention is not limited to these.

The present embodiment defines spectroscopic time as a lapse of time in which the pressure of the gas 74 in the package 72 reaches a predetermined high pressure from a low pressure. During this lapse of time, Laplace transform is performed on the intensity of an incident spectrum. In the fourth embodiment, the pump 76 corresponds to the mass changing means. Arithmetic calculations performed by the arithmetic device 17 are the same as the first embodiment, and repetitive description will be omitted. In this case, "t" reads not as the thickness of the attenuation body but as the mass of the attenuation body, that is, the density in Expressions (6), (7), (8), and (9), which are practical expressions.

Fifth Embodiment

Next, a fifth embodiment will be described with reference to FIG. 17. In the present embodiment, it is assumes that the intensity of a light source is uniform in the one-dimensional direction of the space.

Figure 17:
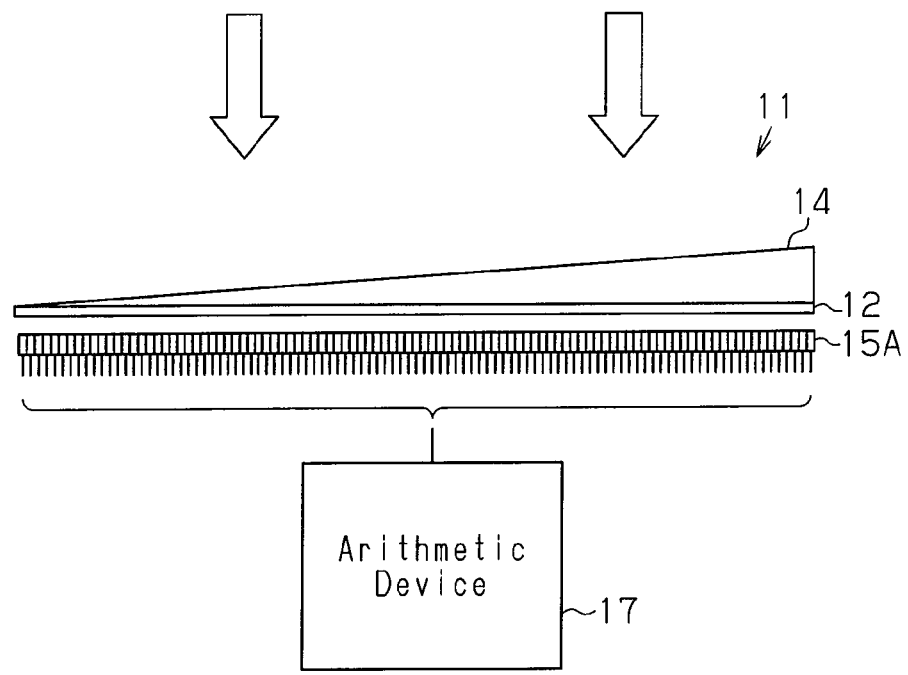
FIG. 17 is a schematic diagram of the electromagnetic wave/particle beam spectroscopic instrument according to a fifth embodiment.
Figure 18:
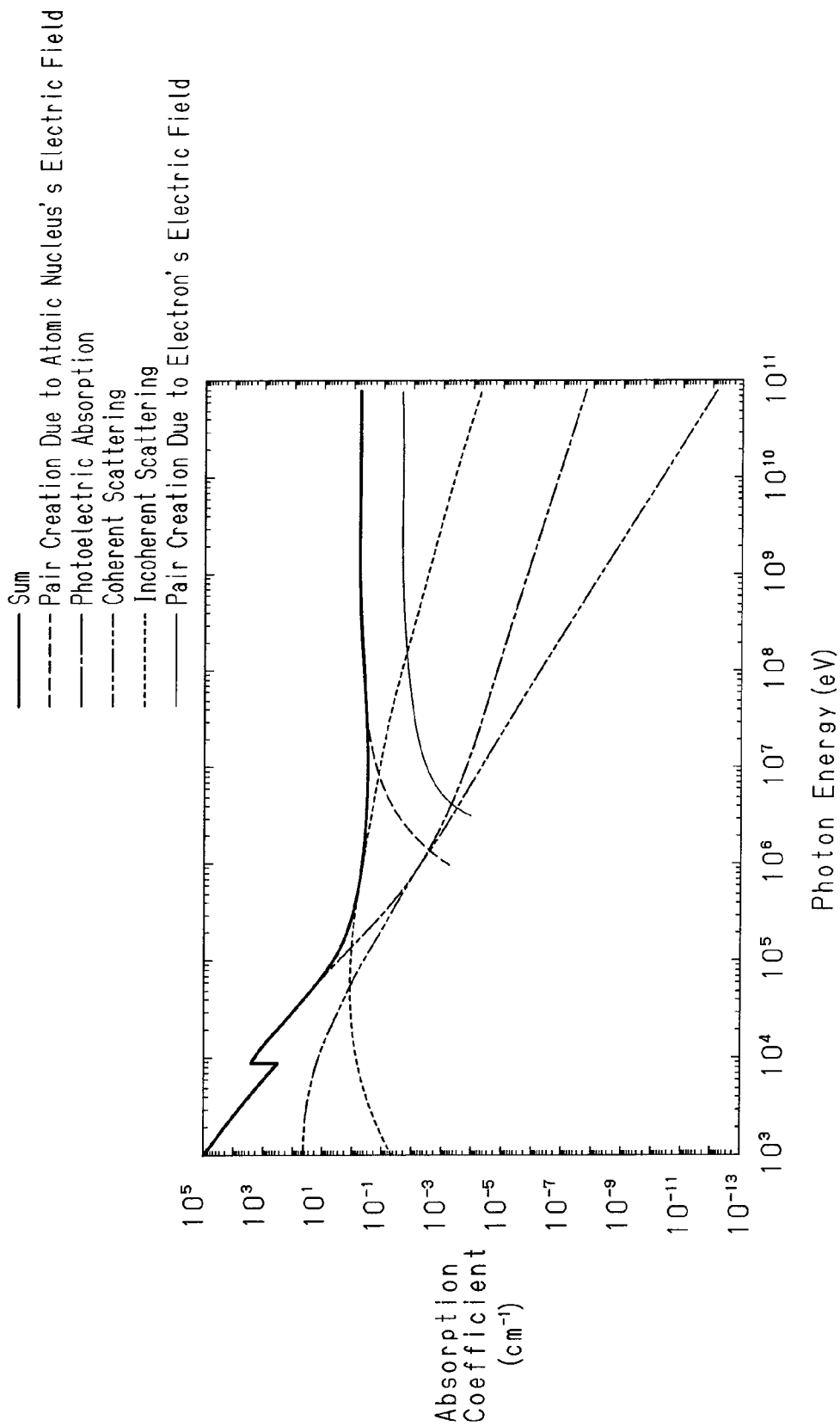
FIG. 18 is a chart showing an absorption coefficient of copper.

Specifically, an energy axis can be converted into a thickness axis of an attenuation body 14 even if the attenuation body 14 which has a triangular cross-sectional shape so that its mass continuously changes in the one-dimensional direction as shown in FIG. 17, that is, even if a static optical element is created. In the present embodiment, a base body 12 is a flat plate made of a material through which an electromagnetic wave/particle beam can pass.

Further, the detection means is constituted of a one-dimensional semiconductor array disposed in the one-dimensional direction. In contrast to the first embodiment, the spectroscopic instrument 10 thus constituted does not rotate the Laplace transform filter 11 and so can measure a spectrum intensity in the shortest spectroscopic lapse of time.

The preceding embodiments may be modified as follows.

The first embodiment has used one detection element 15. However, if a great number of detection elements 15 are disposed behind the Laplace transform filter 11, it is possible to combine all the time resolution and the energy resolution described in (10) of the first embodiment.

Further, in a case where a great number of detection elements 15 are disposed behind the Laplace transform filter 11, the energy resolution and the time resolution balance with each other if the light source has the same intensity as the first embodiment.

Further, for example, if plasma is generated by Large Helical Device and a plasma X-ray source has an emissivity of $10^{12}$ photons/cm$^3$/s, the field of view on the plasma mid plane corresponds to 12 mm, when assuming that a diameter of the detection element 15 of 0.5 mm provides an angle of view of $1.0 \times 10^{-6}$ steradian.

Then, a disc-shaped Laplace transform filter having a diameter of 150 mm is mounted and rotated by a motor (not shown) about the center of the disc, thereby vapor-depositing the attenuation body onto a semicircular portion of this disc in such a manner that the layer thickness changes linearly. Then, by rotating the Laplace transform filter in each period of 20 ms, that is, in such a manner that light can be dispersed twice each time the filter is rotated once, the energy resolution becomes 150 eV, thus enabling measurement of a spectrum each time a time resolution of 10 ms elapses.

Although in the embodiment of FIG. 1, the Laplace transform filter 11 is rotated and the detection element 15 is fixed, the Laplace transform filter 11 may be fixed and the detection element 15 and the light source (not shown) may be rotated at a constant angular velocity in synchronization with each other.

The embodiment of FIG. 1 has been described with reference to the spectroscopic instrument 10 to disperse an X-ray spectrum. However, to cause it to function as a spectroscopic instrument for dispersing particle beams, such as neutron radiations, the material of the attenuation body may be changed. For example, if the attenuation body is solid, boron can be used and, if the attenuation body is gas, hydrogen can be used, thereby dispersing particle beams such as neutron radiations.

The electromagnetic wave/particle beam spectroscopic method in this case need not limit the intensity of an incident spectrum and so can give a high counting rate. Further, advantageously, the present method is not easily deteriorated in spectroscopic capability and is resistant to electromagnetic noise, vibrations, heavy sound, heat and specific particle beams of interest, particle beams other than electromagnetic waves, electric noise due to electromagnetic waves, mechanical destruction, and recoiling of solid constituent atoms and also more resistant to radiation exposure on the detection means than the conventional energy resolving technologies.

Although the detection element 15 of the embodiment of FIG. 1 is not equipped with a cooling device, a typical CCD of the Peltier cooling specifications may be used as the X-ray detector. However, the large sized cooling device is not required as the cooling device.

Although the pump 66 of the third embodiment is driven to increase the amount of the liquid 64 in the package 62, the package 62 may be previously filled with the liquid 64 up to a predetermined height, and the liquid 64 may be discharged via the pump 66 at a constant flow rate per second.

Although the pump 76 of the fourth embodiment is driven to increase the pressure of the gas 74 in the package 72, the package 72 may be previously filled with the gas 74 up to a predetermined pressure, and the gas 74 may be discharged via the pump 76 at a constant flow rate per second, thus depressurizing this package.

11, 60, 70 Laplace transform filter,
12 Platform, 13 Rotary axis, 14 Attenuation body,
15 Detection element (detection means, non-cooling detection means), 16 Optical axis,
17 Arithmetic device (inverse Laplace transforming means, polarized light spectrum intensity calculation means),
18 Display device (display means),
19 Motor (mass changing means), 60 Laplace transform filter,
66 Pump (mass changing means), 70 Laplace transform filter,
72 Package (chamber), 76 Pump (pressure varying means).

The invention claimed is:

1. An electromagnetic wave/particle beam spectroscopic method comprising:
   a first step of causing an incident spectrum to enter a Laplace transform filter to perform Laplace transform on the intensity of the incident spectrum;
   a second step of receiving the spectrum that has passed through the Laplace transform filter to undergo Laplace transform, thereby detecting a transmitted intensity of the incident spectrum by using detection means; and
   a third step of performing inverse Laplace transform on the detected transmitted intensity of the spectrum, thereby calculating the intensity of the incident spectrum that has entered the Laplace transform filter.

2. The electromagnetic wave/particle beam spectroscopic method according to claim 1, wherein the Laplace transform filter includes an attenuation body that attenuates the incident spectrum in accordance with its own mass,
   wherein, at the second step, the transmitted intensity of the incident spectrum is detected by the detection means in a condition where the mass of the attenuation body along an optical axis of the incident spectrum is continuously changing.

3. The electromagnetic wave/particle beam spectroscopic method according to claim 2, wherein at the second step, the mass of the attenuation body along the optical axis of the incident spectrum is changed by mass changing means for continuously changing the mass time-wise.

4. The electromagnetic wave/particle beam spectroscopic method according to claim 3, wherein the mass of the attenuation body along the optical axis of the incident spectrum is arranged so as to linearly change in a direction intersecting with this optical axis, wherein the mass changing means relatively moves at least either one of the Laplace transform filter and the detection means in a direction intersecting with the optical axis.

5. The electromagnetic wave/particle beam spectroscopic method according to claim 3, wherein the Laplace transform filter is equipped with a chamber containing an attenuation body made of gas that attenuates the spectrum in accordance with its own density, wherein the mass changing means continuously changes a pressure of the attenuation body at a site of the Laplace transform filter that faces the detection means, thereby continuously changing the density of the gas.

6. The electromagnetic wave/particle beam spectroscopic method according to claim 2, wherein the attenuation body at the first step is made of a ferromagnetic body, and the incident spectrum is caused to enter in a condition where a magnetic field in a predetermined direction with respect to the optical axis of the incident spectrum is applied to the attenuation body, the method further comprising a fourth step of calculating the intensity of a polarized spectrum based on the intensity of the incident spectrum obtained at the third step.

7. An electromagnetic wave/particle beam spectroscopic instrument comprising:

a Laplace transform filter that receives an incident spectrum and performs Laplace transform on the intensity of the incident spectrum;

detection means that receives the spectrum that has undergone Laplace transform, thereby detecting a transmitted intensity of the spectrum; and inverse Laplace transform means that performs inverse Laplace transform on the detected transmitted intensity of the spectrum, thereby calculating the intensity of the incident spectrum that has entered the Laplace transform filter.

8. The electromagnetic wave/particle beam spectroscopic instrument according to claim 7, wherein the Laplace transform filter includes an attenuation body that attenuates the spectrum in accordance with its own mass, the instrument further comprising mass changing means that continuously changes the mass of the attenuation body along the optical axis of the incident spectrum time-wise.

9. The electromagnetic wave/particle beam spectroscopic instrument according to claim 8, wherein the mass of the attenuation body along the optical axis of the incident spectrum is arranged so as to linearly change in a direction intersecting with this optical axis, wherein the mass changing means relatively moves the Laplace transform filter and the detection means in a direction intersecting with the optical axis.

10. The electromagnetic wave/particle beam spectroscopic instrument according to claim 8, wherein the Laplace transform filter is equipped with a chamber containing an attenuation body made of gas that attenuates the spectrum in accordance with its own density, wherein the mass changing means continuously changes a pressure in the chamber time-wise when receiving the spectrum.

11. The electromagnetic wave/particle beam spectroscopic instrument according to claim 8, wherein the attenuation body is made of a ferromagnetic body, the instrument further comprising:

magnetic field creation means that magnetizes the ferromagnetic body by applying a magnetic field in a predetermined direction with respect to the optical axis of the incident spectrum; and polarized spectrum intensity calculation means that calculates the intensity of a polarized spectrum based on the intensity of the incident spectrum obtained by the inverse Laplace transform means.

12. The electromagnetic wave/particle beam spectroscopic instrument according to claim 8, wherein a pinhole is disposed between the detection means and the attenuation body, the pinhole allowing transmitted light of the spectrum to form an image on the detection means.

13. The electromagnetic wave/particle beam spectroscopic instrument according to claim 7, wherein the Laplace transform filter includes an attenuation body that attenuates the spectrum in accordance with its own mass, wherein the attenuation body is configured such that its mass changes in a direction intersecting with the optical axis of the incident spectrum, and wherein the detection means is disposed across a direction intersecting with the optical axis of the incident spectrum.

14. The electromagnetic wave/particle beam spectroscopic instrument according to claim 7, wherein the detection means is non-cooling detection means.

* * * * *